US011431989B2

(12) United States Patent
Sasai et al.

(10) Patent No.: US 11,431,989 B2
(45) Date of Patent: *Aug. 30, 2022

(54) IMAGE DECODING METHOD, IMAGE CODING METHOD, IMAGE DECODING APPARATUS, IMAGE CODING APPARATUS, AND IMAGE CODING AND DECODING APPARATUS

(71) Applicant: Sun Patent Trust, New York, NY (US)

(72) Inventors: Hisao Sasai, Osaka (JP); Takahiro Nishi, Nara (JP); Youji Shibahara, Osaka (JP); Toshiyasu Sugio, Osaka (JP); Kyoko Tanikawa, Osaka (JP); Toru Matsunobu, Osaka (JP)

(73) Assignee: SUN PATENT TRUST, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/106,691

(22) Filed: Nov. 30, 2020

(65) Prior Publication Data

US 2021/0084310 A1 Mar. 18, 2021

Related U.S. Application Data

(63) Continuation of application No. 16/599,417, filed on Oct. 11, 2019, now Pat. No. 10,887,606, which is a
(Continued)

(51) Int. Cl.
*H04N 19/16* (2014.01)
*H04N 19/196* (2014.01)
(Continued)

(52) U.S. Cl.
CPC ............. *H04N 19/16* (2014.11); *H04N 19/11* (2014.11); *H04N 19/176* (2014.11);
(Continued)

(58) Field of Classification Search
CPC .............. H04N 19/00218; H04N 7/50; H04N 7/26244; H04N 7/26941; H04N 7/26335; H04N 19/00018
See application file for complete search history.

(56) References Cited

U.S. PATENT DOCUMENTS 6,907,142 B2   6/2005   Kalevo et al.
7,236,524 B2   6/2007   Sun et al.
(Continued)

FOREIGN PATENT DOCUMENTS

JP   2003-520531   7/2003
JP   2005-528047   9/2005
(Continued)

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 16-23, 2011.
(Continued)

*Primary Examiner* — Shawn S An
(74) *Attorney, Agent, or Firm* — Wenderoth, Lind & Ponack, L.L.P.

(57) ABSTRACT

An image decoding method of decoding, on a block-by-block basis, image data included in a coded stream includes: deriving candidates for an intra prediction mode to be used for intra prediction for a decoding target block, the number of the candidates constantly being a plural number; obtaining, from the coded stream, an index for identifying one of the derived candidates for the intra prediction mode; and determining, based on the obtained index, one of the derived candidates for the intra prediction mode as the intra prediction mode to be used for intra prediction for the decoding target block.

2 Claims, 32 Drawing Sheets

Related U.S. Application Data continuation of application No. 16/274,525, filed on Feb. 13, 2019, now Pat. No. 10,484,692, which is a continuation of application No. 15/819,572, filed on Nov. 21, 2017, now Pat. No. 10,250,887, which is a continuation of application No. 13/495,038, filed on Jun. 13, 2012, now Pat. No. 9,860,539.

(60) Provisional application No. 61/496,237, filed on Jun. 13, 2011.

(51) Int. Cl.
  *H04N 19/176* (2014.01)
  *H04N 19/11* (2014.01)
  *H04N 19/463* (2014.01)
  *H04N 19/593* (2014.01)

(52) U.S. Cl.
  CPC ......... *H04N 19/197* (2014.11); *H04N 19/463* (2014.11); *H04N 19/593* (2014.11)

(56) References Cited

U.S. PATENT DOCUMENTS

| | | | |
|---|---|---|---|
| 7,289,672 | B2 | 10/2007 | Sun et al. |
| 7,295,713 | B2 | 11/2007 | Kalevo et al. |
| 7,386,048 | B2 | 6/2008 | Sun et al. |
| 7,567,719 | B2 | 7/2009 | Kalevo et al. |
| 8,228,986 | B2 | 7/2012 | Sun et al. |
| 8,233,538 | B2 | 7/2012 | Sun et al. |
| RE43,567 | E | 8/2012 | Sun et al. |
| 8,249,147 | B2 | 8/2012 | Watanabe et al. |
| 8,275,235 | B2 | 9/2012 | Kang et al. |
| 8,279,927 | B2 | 10/2012 | Sun et al. |
| 8,331,450 | B2 | 12/2012 | Sun et al. |
| 8,396,344 | B2 | 3/2013 | Kang et al. |
| 8,538,248 | B2 | 9/2013 | Kang et al. |
| 8,542,977 | B2 | 9/2013 | Kang et al. |
| 9,319,715 | B2* | 4/2016 | Oh .................. H04N 19/11 |
| 10,075,723 | B2 | 9/2018 | Boon |
| 10,250,887 | B2* | 4/2019 | Sasai .................. H04N 19/176 |
| 10,484,692 | B2* | 11/2019 | Sasai .................. H04N 19/176 |
| 10,887,606 | B2* | 1/2021 | Sasai .................. H04N 19/16 |
| 2001/0017942 | A1 | 8/2001 | Kalevo et al. |
| 2003/0223495 | A1 | 12/2003 | Sun et al. |
| 2003/0223496 | A1 | 12/2003 | Sun et al. |
| 2003/0223645 | A1 | 12/2003 | Sun et al. |
| 2005/0254717 | A1 | 11/2005 | Kalevo et al. |
| 2006/0120461 | A1 | 6/2006 | Knight |
| 2006/0204228 | A1 | 9/2006 | Kang et al. |
| 2006/0216000 | A1 | 9/2006 | Kang et al. |
| 2006/0233530 | A1 | 10/2006 | Kang et al. |
| 2006/0291556 | A1 | 12/2006 | Watanabe et al. |
| 2008/0159641 | A1* | 7/2008 | Moriya ............. H04N 19/186 |
| | | | 382/239 |
| 2008/0175318 | A1 | 7/2008 | Sun et al. |
| 2008/0175319 | A1 | 7/2008 | Sun et al. |
| 2008/0175320 | A1 | 7/2008 | Sun et al. |
| 2008/0175321 | A1 | 7/2008 | Sun et al. |
| 2008/0198928 | A1 | 8/2008 | Fujisawa |
| 2008/0247657 | A1 | 10/2008 | Kalevo et al. |
| 2010/0046621 | A1* | 2/2010 | Horiuchi ............. H04N 19/11 |
| | | | 375/240.12 |
| 2011/0113451 | A1 | 5/2011 | Kang et al. |
| 2011/0243229 | A1* | 10/2011 | Kim ..................... H04N 19/61 |
| | | | 375/E7.243 |
| 2012/0106636 | A1* | 5/2012 | Kim ..................... H04N 19/11 |
| | | | 375/E7.243 |
| 2012/0307894 | A1 | 12/2012 | Chien et al. |
| 2013/0064296 | A1 | 3/2013 | Sun et al. |

FOREIGN PATENT DOCUMENTS

| | | |
|---|---|---|
| JP | 2013-012791 | 1/2013 |
| TW | I327030 | 7/2010 |
| TW | I328357 | 8/2010 |
| TW | I329843 | 9/2010 |
| TW | I330976 | 9/2010 |
| WO | 2011/031332 | 3/2011 |
| WO | 2012/087077 | 6/2012 |
| WO | 2012/1/012 | 12/2012 |

OTHER PUBLICATIONS

Jianle Chen, BoG report on intra mode coding with fixed number of MPM candidates, Joint Collaborative Team on Video Coding (JCT-VC) of ITU-T SG16 WP3 and ISO/IEC JTC1/SC29/WG11 6th Meeting: Torino, Jul. 14, 2011, [JCTVC-F765].

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver. 5, 5th Meeting: Geneva, CH, Mar. 16-23, 2011.

Mei Guo et al., Improved Intra Mode Coding, Joint Collaborative Team on Video Coding (JCT-VC) of ITU-T SG16 WP3 and ISO/IEC JTC1/SC29/WG11, 4th Meeting: Daegu, Korea, Jan. 2011, JCTVC-D166, pp. 1-7.

Sandeep Kanumuri et al., Enhancements to Intra Coding, Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D235, pp. 1-7.

Wenpeng Ding et al. Improved Intra Mode Coding by Multiple Mode Candidates, Joint Collaborative Team on Video Coding (JCT-VC) of ITU-T SG16 WP3 and ISO/IEC JTC1/SC29/WG11, 4th Meeting: Daegu, Korea, Jan. 2011, JCTVC-D253, pp. 1-5.

Tzu-Der Chuang et al., Luma Intra Prediction Mode Coding, Joint Collaborative Team on Video Coding (JCT-VC) of ITU-T SG16 WP3 and ISO/IEC JTC1/SC29/WG11, 6th Meeting: Torino, IT, Jul. 2011, JCTVC-F062, pp. 1-5.

Toru Kumakura et al., Fixing the number of mpm candidates, Joint Collaborative Team on Video Coding (JCT-VC) of ITU-T SG16 WP3 and ISO/IEC JTC1/SC29/WG11, 6th Meeting: Torino, IT, Jul. 2011, JCTVC-F340, pp. 1-8.

Vadim Seregin et al. Intra mode parsing without access neighbouring information, Joint Collaborative Team on Video Coding (JCT-VC) of ITU-T SG16 WP3 and ISO/IEC JTC1/SC29/WG11, 6th Meeting: Torino, IT, Jul. 2011, JCTVC-F378_r3, pp. 1-5.

Wei-Jung Chien et al., Parsing friendly intra mode coding, Joint Collaborative Team on Video Coding (JCT-VC) of ITU-T SG16 WP3 and ISO/IEC JTC1/SC29/WG11, 6th Meeting: Torino, IT, Jul. 2011, JCTVC-F459r2, pp. 1-5.

Extended European Search Report dated Aug. 6, 2014 in European Application No. 12799908.4.

Office Action and Search Report dated Dec. 7, 2015 in Taiwanese Patent Application No. 101121098, with English translation of Search Report.

* cited by examiner

FIG. 6A

Prediction unit syntax

| | Descriptor |
|---|---|
| prediction_unit(x0, y0, log2PUWidth, log2PUHeight PartIdx, InferredMergeFlag) { | |
|   if(skip_flag[x0][y0]) { | u(1) \| ae(v) |
|   ———————#Omitted——————— | |
|   } else if(PredMode == MODE_INTRA) { | |
|     prev_intra_luma_pred_flag[x0][y0] | u(1) \| ae(v) |
|     if(prev_intra_luma_pred_flag[x0][y0]) | |
|       if( NumMPMCand > 1 ) | |
|         mpm_idx [x0][y0] | ce(1) \| ae(v) |
|     else | |
|       rem_intra_luma_pred_mode[x0][y0] | ue(1) \| ae(v) |
|     intra_chroma_pred_mode[x0][y0] | |
|   } else {/* MODE_INTRA*/ | |
|     #Omitted | |
|   } | |
| } | |

Prediction unit syntax

| | Descriptor |
|---|---|
| prediction_unit(x0, y0, log2PU Width, log2PUHeight PartIdx, InferredMergeFlag) { | |
| if(skip_flag[x0][y0]) { | |
| #Omitted | |
| } else if(PredMode == MODE_INTRA) { | |
| prev_intra_luma_pred_flag[x0][y0] | u(1) \| ae(v) |
| if(prev_intra_luma_pred_flag[x0][y0]) | |
| mpm_idx [x0][y0] | u(1) \| ae(v) |
| else | |
| rem_intra_luma_pred_mode[x0][y0] | ce(1) \| ae(v) |
| intra_chroma_pred_mode[x0][y0] | ue(1) \| ae(v) |
| } else { /* MODE_INTRA*/ | |
| #Omitted | |
| } | |
| } | |

| MPM1 | 10 |
|---|---|
| MPM2 | 11 |
| 0 | 0000 |
| 1 | 00101 |
| 2 | 00100 |
| 3 | 00011 |
| 4 | 00001 |
| 5 | 011000 |
| 6 | 010111 |
| 7 | 010110 |
| 8 | 010101 |
| 10 | 010100 |
| 9 | 010011 |
| 11 | 010010 |
| 12 | 010001 |
| 13 | 010000 |
| 14 | 001111 |
| 15 | 001110 |
| 16 | 001101 |
| 17 | 001100 |
| 18 | 0111111 |
| 19 | 0111110 |
| 20 | 0111101 |
| 21 | 0111100 |
| 22 | 0111011 |
| 23 | 0111010 |
| 24 | 0111001 |
| 25 | 0111000 |
| 26 | 0110111 |
| 27 | 0110110 |
| 28 | 0110101 |
| 29 | 0110100 |
| 30 | 0110011 |
| 31 | 0110010 |

Figure 8-1 - Intra prediction mode directions (informative)
Extracted from Non-Patent Literature 1

FIG. 22

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

Stream of TS packets

Multiplexed data

Data structure of PMT

FIG. 33
| Corresponding standard | Driving frequency |
|---|---|
| MPEG-4 AVC | 500 MHz |
| MPEG-2 | 350 MHz |
| ⋮ | ⋮ |
FIG. 34A
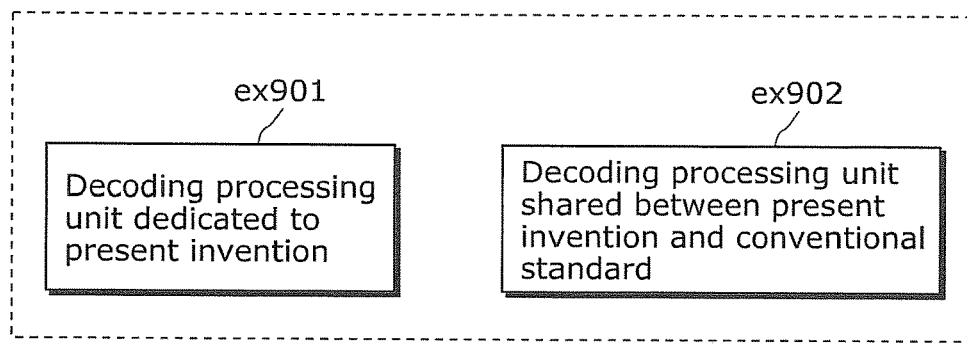
ex900
FIG. 34B
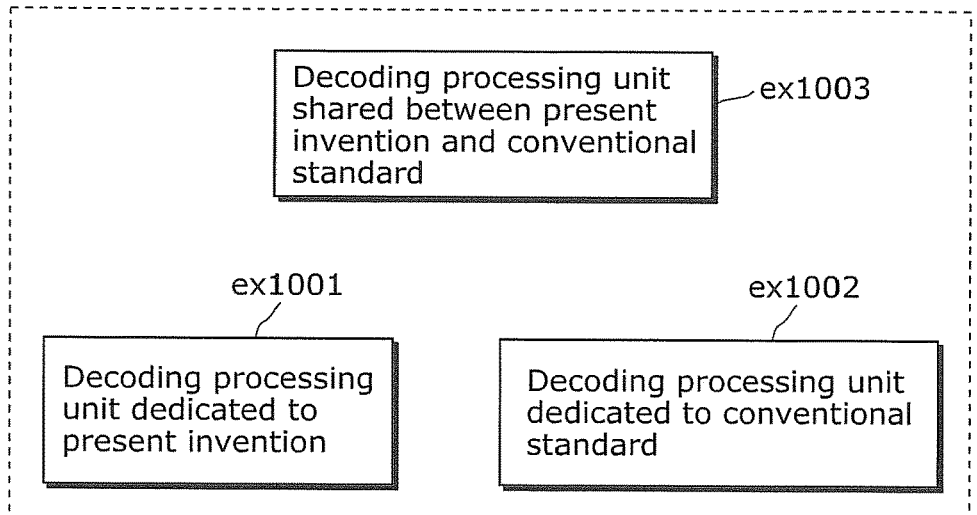
ex1000

IMAGE DECODING METHOD, IMAGE CODING METHOD, IMAGE DECODING APPARATUS, IMAGE CODING APPARATUS, AND IMAGE CODING AND DECODING APPARATUS

TECHNICAL FIELD

The present disclosure relates to moving picture decoding methods and moving picture coding methods, and in particular, to methods of decoding and coding mode information including intra prediction mode numbers used for generating prediction pixels.

BACKGROUND ART

In the High Efficiency Video Coding (HEVC) Standard that is one of the next-generation image coding standards, various considerations for increasing coding efficiency have been made (see Non-patent Literature 1).

Examples of coding include inter frame coding and intra coding. In the inter frame coding, compression is performed by inter frame prediction where a prediction image is generated with reference to pixel information of a previous frame. In the intra coding, compression is performed by intra prediction where a prediction image is generated with reference to pixel information within a picture.

In the intra coding, modes are prepared in number (intraPredModeNum) corresponding to the predetermined sizes of coding target blocks (the predetermined sizes are, for example, the values of log2TrafoSize and the types of Prediction Units) in order to differentiate the directions etc. for generating intra prediction pixels.

For example, it is currently considered to prepare 34 modes (the value of intraPredModeNum is 34) for coding target blocks each having a value of the size log2TrafoSize within a range from 3 to 5 inclusive (FIG. 15).

These modes are called intra prediction modes (IntraPredMode). The value of the intra prediction mode (intra prediction mode number) is a value that represents a corresponding prediction direction. For example, there are 34 or 17 intra prediction modes. For example, a value (or a label) "0" of the intra prediction mode number shows the vertical (direction), a value "1" of the intra prediction mode number shows the horizontal (direction), a value "2" of the intra prediction mode number shows no direction called DC mode prediction, and values of 3 and larger (values between 3 and 33 inclusive for blocks having a predetermined size) of the intra prediction mode number show predetermined-angle directions associated respectively thereto.

Hereinafter, in this Description, the intra prediction mode number associated with a coding target block is referred to as a "target mode number". The value indicated by a code string obtained by coding the "target mode number" according to a predetermined coding scheme is referred to as a "coding mode number" in order to differentiate from the "target mode number".

For decoding a decoding target block (such as a luminance block), mode information is used which is "information for identifying which one of intra prediction modes should be used". The mode information is generated for each prediction unit (hereinafter, referred to as PU).

At present, it is currently considered that mode information includes three information pieces as indicated below.

(I1) A "prediction mode use flag" (prev_intra_luma_pred_flag) that is a flag determining whether or not to use the value of intra prediction mode of an adjacent PU decoded before (I2) A "candidate prediction mode number" (mpm_idx) that is an index indicating, when there are two or more candidates for the intra prediction mode (hereinafter, referred to as candidate intra prediction modes), which one of the candidate intra prediction modes should be used For example, the default index value is "0" which indicates the first candidate intra prediction mode.

(I3) A "coding mode number" (rem_intra_luma_pred_mode) that is a code (value) associated with a "target mode number" when the intra prediction mode number of an adjacent PU decoded before is not used In the decoding process, (1) the "coding mode number" is first extracted from the code string included in the mode information according to a predetermined variable length decoding method etc. (arithmetic decoding method etc.), and (2) using the extracted value, the "target mode number" (any one of the aforementioned 34 modes from 0 to 33 inclusive) is derived (or information used for the derivation is derived).

CITATION LIST

Non Patent Literature

Joint Collaborative Team on Video Coding (JCT-VC) of ITU-T SG16 WP3 and ISO/IEC JTC1/SC29/WG11 5th Meeting: Geneva, CH,-6-23 March, 2011 JCTVC-E603 Title:WD3: Working Draft 3 of High-Efficiency Video Coding ver.5 http://phenix. int-evry.fr/jct/doc_end_user/docurnents/5_Geneva/wg 11/JCTVC-E603-v5.zip

SUMMARY OF INVENTION

Technical Problem

However, in the conventional intra coding, the compression efficiency of the mode information is insufficient.

The present disclosure has been conceived to solve such a drawback and is aimed at providing an image coding method, an image coding apparatus, an image decoding method, an image decoding apparatus, and an image coding and decoding apparatus which compress mode information with higher efficiency.

Solution to Problem

In order to solve the above drawback, an image decoding method according to an exemplary embodiment of the present disclosure is an image decoding method of decoding, on a block-by-block basis, image data included in a coded stream. The image decoding method includes: deriving candidates for an intra prediction mode to be used for intra prediction for a decoding target block, the number of the candidates constantly being a plural number; obtaining, from the coded stream, an index for identifying one of the derived candidates for the intra prediction mode; and determining, based on the obtained index, one of the derived candidates for the intra prediction mode as the intra prediction mode to be used for intra prediction for the decoding target block.

In order to solve the above drawback, an image coding method according to an exemplary embodiment of the present disclosure is an image coding method of generating a coded stream by coding image data on a block-by-block basis. The image coding method includes: deriving candidates for an intra prediction mode to be used for intra prediction for a decoding target block corresponding to a coding target block, the number of the candidates constantly being a plural number; determining one of the derived candidates for the intra prediction mode as the intra prediction mode to be used for intra prediction for the decoding target block; and adding, to the coded stream, an index for identifying the determined one of the derived candidates for the intra prediction mode.

In order to solve the above drawback, an image decoding apparatus according to an exemplary embodiment of the present disclosure is an image decoding apparatus for decoding, on a block-by-block basis, image data included in a coded stream. The image decoding apparatus includes: a deriving unit configured to derive candidates for an intra prediction mode to be used for intra prediction for a decoding target block, the number of the candidates constantly being a plural number; an obtaining unit configured to obtain, from the coding stream, an index for identifying one of the derived candidates for the intra prediction mode; and a determining unit configured to determine, based on the obtained index, one of the derived candidates for the intra prediction mode as the intra prediction mode to be used for intra prediction for the decoding target block.

In order to solve the above drawback, an image coding apparatus according to an exemplary embodiment of the present disclosure is an image coding apparatus for generating a coded stream by coding an image data on a block-by-block basis. The image coding apparatus includes: a deriving unit configured to derive candidates for an intra prediction mode to be used for intra prediction for a decoding target block corresponding to a coding target block, the number of the candidates constantly being a plural number; a determining unit configured to determine one of the derived candidates for the intra prediction mode as the intra prediction mode to be used for intra prediction for the decoding target block; and an adding unit configured to add, to the coding stream, an index for identifying the determined one of the derived candidates for the intra prediction mode.

In order to solve the above drawback, an image coding and decoding apparatus according to an exemplary embodiment of the present disclosure includes: the image decoding apparatus; and the image coding apparatus.

These general and specific aspects may be implemented by using a system, a method, an integrated circuit, a computer program, a recording medium or any combination of the system, method, integrated circuit, computer program, or recording medium.

Advantageous Effects of Invention

According to the present disclosure, it is possible to reduce the processing amount while maintaining coding efficiency.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 6A is a conceptual diagram illustrating an example of a conventional syntax structure;

FIG. 6B is a conceptual diagram illustrating an example of a syntax structure according to Embodiment 1;

FIG. 9B is another example of the coding table used in the another method of coding the coding mode number (Step S217);

FIG. 22 illustrates a structure of multiplexed data;

FIG. 33 shows an example of a look-up table in which video data standards are associated with driving frequencies;

FIG. 34A is a diagram showing an example of a configuration for sharing a module of a signal processing unit; and FIG. 34B is a diagram showing another example of a configuration for sharing a module of the signal processing unit.

DESCRIPTION OF EMBODIMENTS

Figure 1:
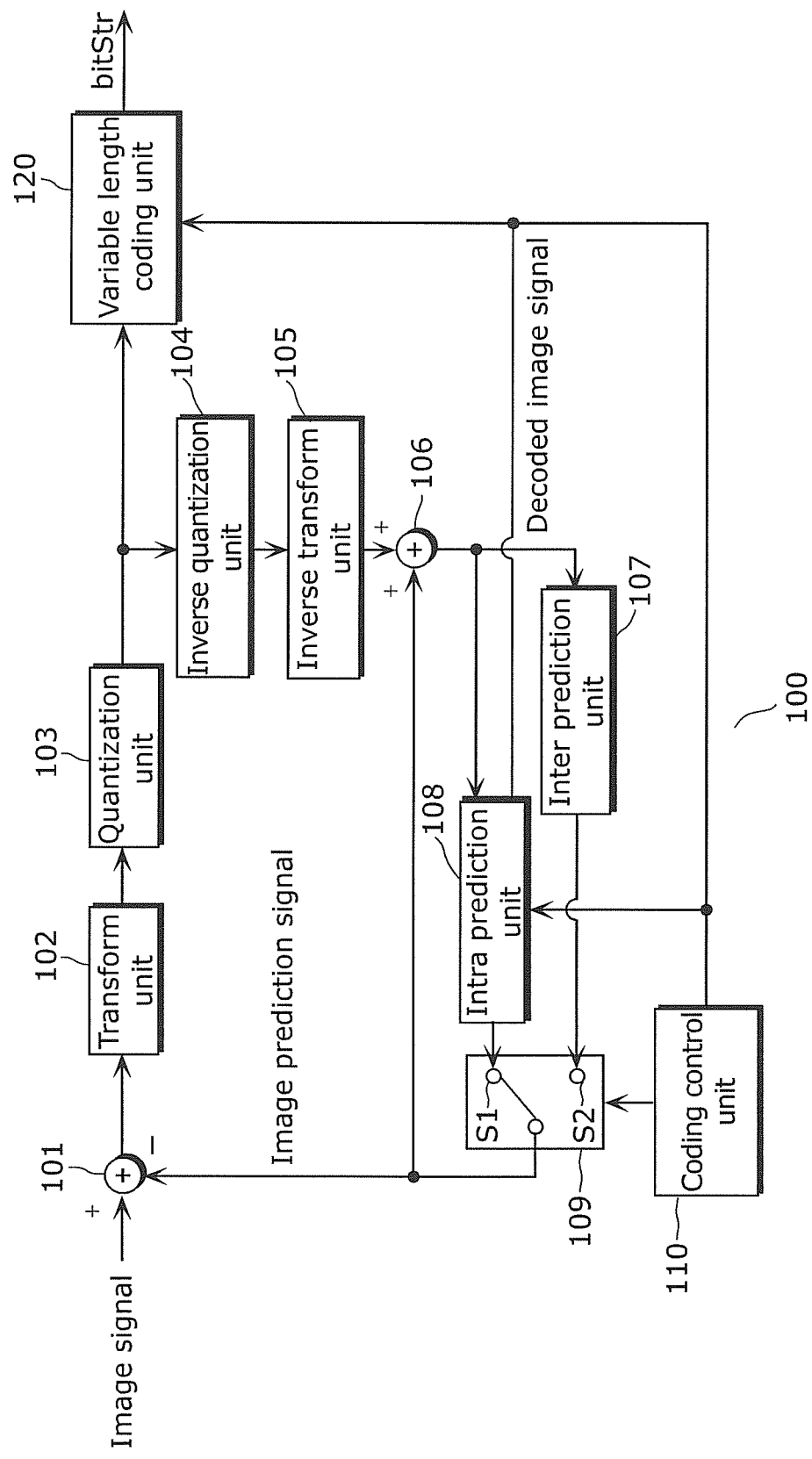
FIG. 1 is a block diagram illustrating a configuration example of an image coding apparatus according to Embodiment 1.

In order to solve the above drawback, an image decoding method according to an exemplary embodiment of the present disclosure is an image decoding method of decoding, on a block-by-block basis, image data included in a coded stream. The image decoding method includes: deriving candidates for an intra prediction mode to be used for intra prediction for a decoding target block, the number of the candidates constantly being a plural number; obtaining, from the coded stream, an index for identifying one of the derived candidates for the intra prediction mode; and determining, based on the obtained index, one of the derived candidates for the intra prediction mode as the intra prediction mode to be used for intra prediction for the decoding target block.

The followings are three possible structures of the conventional mode information.

(M1) When one of the candidate intra prediction modes is used and there are a plurality of candidate intra prediction modes (the value of NumMPMCand is greater than 1), mode information includes the (I1) "prediction mode use flag" and the (I2) "candidate prediction mode number".

(M2) When the candidate intra prediction mode is used and there is one candidate intra prediction mode, the mode information includes only the (I1) "prediction mode use flag". This is because the target mode number is uniquely identified when there is only one candidate intra prediction mode, thereby not requiring the (I2) "candidate prediction mode number". Conventionally, the "candidate prediction mode number" is not included when there is only one candidate intra prediction mode, to reduce the information amount of the mode information.

(M3) When no candidate intra prediction mode is used, the mode information includes the (I1) "prediction mode use flag" and the (I3) "coding mode number" obtained by coding the target mode number. The information amount of the "coding mode number" is significantly greater than that of the (I2) "candidate prediction mode number" or the like.

In the image decoding method with the above configuration, two or more candidates are constantly derived, resulting in the high rate of the PUs which use the candidate intra prediction modes. In other words, it is possible to reduce the information amount because the rate of the mode information (M2) having relatively smaller amount of information increases and the rate of the mode information (M3) having larger amount of information decreases. When the mode information corresponds to the conventional mode information (M1), the same information amount as that of the mode information (M2) is necessary; and thus, when the mode information corresponds to the conventional mode information (M1), the information amount increases. However, the information amount of the (I2) "candidate prediction mode number" is significantly smaller than that of the (I3) "coding mode number". As a result, the mount of reduced information is greater than the amount of increased information in an entire frame or an entire coding target block, leading to a reduction in the amount of the mode information.

Furthermore, for example, it may be that the plural number is a fixed number.

According to the image decoding method with the above configuration, the number of the candidate intra prediction modes to be derived is fixed to two or more. As a result, when a candidate intra prediction mode is used, it is not necessary to perform a process for determining the number of candidate intra prediction modes.

The process for determining the number of candidate intra prediction modes is, for example, a process for determining whether or not the number of candidate intra prediction modes indicated by the conditional expression 901 "if (NumMPMCand>1)" in FIG. 6A is 1. In the process, for example, a process is necessary which is for obtaining the intra prediction mode numbers of the PUs to be referred to and determining whether or not the intra prediction mode numbers of the PUs match one another.

Here, the process for deriving the intra prediction mode numbers of the PUs to be referred to and the process for obtaining the intra prediction mode used for a decoding target block may be performed in parallel to increase processing speed. Conventionally, when the (I1) "prediction mode use flag" indicates the use of the candidate intra prediction mode, a result of the process for deriving the intra prediction mode numbers of the PUs to be referred to needs to be obtained in order to determine whether or not a coding stream includes an index. As a result, the process for obtaining the intra prediction mode used for a decoding target block cannot be performed till the result is obtained, which results in an insufficient increase of the processing speed.

On the other hand, according to the image decoding method with the above configuration, the fixed number that is two or more of the candidate prediction modes are constantly generated. As a result, the process for determining the number of candidate intra prediction modes is not necessary, allowing the decoding of parameters at the decoding side independently of the number of prediction modes (the number of candidates). As a result, it is possible to perform the process for obtaining the intra prediction mode used for the decoding target block without waiting for the result of the process for deriving the intra prediction mode numbers of the PUs to be referred to. It allows an increase of the processing speed of an apparatus which executes the image decoding method.

For example, it may be that the deriving includes: deriving a first candidate for the intra prediction mode to be used for intra prediction for the decoding target block from an intra prediction mode used for intra prediction for each of adjacent blocks that are adjacent to the decoding target block; determining whether or not the number of the derived first candidates is smaller than the plural number; and further deriving a second candidate for the intra prediction mode to be used for intra prediction for the decoding target block, when it is determined that the number of the derived first candidates is smaller than the plural number.

For example, it may also be that in the deriving of a first candidate, the number of the adjacent blocks for which the intra prediction mode used for intra prediction is obtained equals the plural number.

For example, it may also be that in the deriving of a second candidate, the second candidate is derived such that a total number of the first candidates and the second candidates equals the plural number.

For example, it may also be that in the deriving of a second candidate, an intra prediction mode different from the intra prediction mode used for intra prediction for each of the adjacent blocks that are adjacent to the decoding target block is derived as the second candidate.

For example, it may also be that in the deriving of a second candidate, at least one of (i) an intra prediction mode indicating prediction using a mean value of pixel values of the decoding target block, (ii) an intra prediction mode indicating plane prediction, and (iii) an intra prediction mode indicating vertical prediction, is derived as the second candidate.

For example, it may also be that the coded stream includes a flag indicating whether to use one of the candidates for the intra prediction mode, when the flag indicates that one of the candidates for the intra prediction mode is used, (i) in the obtaining, the index is obtained, and (ii) in the determining, the one of the derived candidates is determined as the intra prediction mode to be used for intra prediction for the decoding target block, and when the flag indicates that one of the candidates for the intra prediction mode is not used, (i) in the obtaining, a mode number is obtained from the coded stream, the mode number indicating the intra prediction mode to be used for intra prediction for the decoding target block, and (ii) in the determining, the intra prediction mode to be used for intra prediction for the decoding target block is determined based on the obtained mode number.

For example, it may also be that in the deriving, (i) when an adjacent block that is adjacent to the decoding target block exists, an intra prediction mode other than the intra prediction mode used for intra prediction for the adjacent block is derived as the candidates for the intra prediction mode, and (ii) when the adjacent block that is adjacent to the decoding target block does not exist, the candidates for the intra prediction mode are derived based on a predetermined condition.

For example, it may also be that in the deriving, a candidate list is further generated using the candidates for the intra prediction mode, and the index is a number for identifying one of the candidates for the intra prediction mode included in the candidate list.

In order to solve the above drawback, an image coding method according to an exemplary embodiment of the present disclosure is an image coding method of generating a coded stream by coding image data on a block-by-block basis. The image coding method includes: deriving candidates for an intra prediction mode to be used for intra prediction for a decoding target block corresponding to a coding target block, the number of the candidates constantly being a plural number; determining one of the derived candidates for the intra prediction mode as the intra prediction mode to be used for intra prediction for the decoding target block; and adding, to the coded stream, an index for identifying the determined one of the derived candidates for the intra prediction mode.

For example, it may be that the plural number is a fixed number.

For example, it may also be that in the determining, a candidate which matches the intra prediction mode used for intra prediction for the coding target block is determined as the one of the derived candidates for the intra prediction mode, the candidate being included in the derived candidates for the intra prediction mode.

In order to solve the above drawback, an image decoding apparatus according to an exemplary embodiment of the present disclosure is an image decoding apparatus for decoding, on a block-by-block basis, image data included in a coded stream. The image decoding apparatus includes: a deriving unit configured to derive candidates for an intra prediction mode to be used for intra prediction for a decoding target block, the number of the candidates constantly being a plural number; an obtaining unit configured to obtain, from the coding stream, an index for identifying one of the derived candidates for the intra prediction mode; and a determining unit configured to determine, based on the obtained index, one of the derived candidates for the intra prediction mode as the intra prediction mode to be used for intra prediction for the decoding target block.

In order to solve the above drawback, an image coding apparatus according to an exemplary embodiment of the present disclosure is an image coding apparatus for generating a coded stream by coding an image data on a block-by-block basis. The image coding apparatus includes: a deriving unit configured to derive candidates for an intra prediction mode to be used for intra prediction for a decoding target block corresponding to a coding target block, the number of the candidates constantly being a plural number; a determining unit configured to determine one of the derived candidates for the intra prediction mode as the intra prediction mode to be used for intra prediction for the decoding target block; and an adding unit configured to add, to the coding stream, an index for identifying the determined one of the derived candidates for the intra prediction mode.

In order to solve the above drawback, an image coding and decoding apparatus according to an exemplary embodiment of the present disclosure includes the image decoding apparatus; and the image coding apparatus.

A part or all of the constituent elements constituting the image coding apparatus and the image decoding apparatus may be configured from a single system LSI (Large Scale Integration). The system LSI is a super-multifunction LSI manufactured by integrating constitute units on one chip, and is specifically a computer system configured by including a microprocessor, a ROM, a RAM (Random Access Memory), and so on.

Hereinafter, certain exemplary embodiments of the present disclosure are described with reference to the accompanying Drawings. Each of the exemplary embodiments described below shows a desirable specific example. The structural elements, the arrangement and connection of the structural elements, steps, the processing order of the steps etc. shown in the following exemplary embodiments are mere examples, and therefore do not limit the present disclosure. Therefore, among the structural elements in the following embodiments, structural elements not recited in any one of the independent claims defining the most generic part of the present disclosure are described as arbitrary structural elements.

Embodiment 1

Referring to FIG. 1 to FIG. 6B, descriptions are given of an image coding method, and an image coding apparatus which executes the image coding method according to Embodiment 1.

The image coding apparatus has a function to generate, for each PU, mode information indicating the intra prediction mode used for intra prediction. In Embodiment 1, an example case is described where the number of candidate intra prediction modes is fixed to two in advance (the fixed number that is two or more candidate intra prediction modes are constantly derived). It is to be noted that the same methods may also be used in a case where the number of candidate intra prediction modes is fixed to three or more or a case where the number of candidate intra prediction modes is set to be a variable value that is two or more.

[1-1. Configuration of Image Coding Apparatus]

Referring to FIG. 1, a description is given of a configuration of an image coding apparatus according to Embodiment 1. FIG. 1 is a block diagram illustrating a configuration of an image coding apparatus 100.

The image coding apparatus 100 receives an input of an image signal, codes the image signal, and outputs, to an image decoding apparatus (not shown in FIG. 1), a bitstream (bitStr) that is output from a variable length coding unit 120 to be described later.

As shown in FIG. 1, the image coding apparatus 100, for example, includes: a subtraction unit 101 which outputs a subtracted image between an image indicated by an image signal and a prediction image; a transform unit 102 which performs, for example, discrete cosine transform (DCT) on the subtracted image; a quantization unit 103 which quantizes the subtracted image which underwent DCT; an inverse quantization unit 104 which performs inverse quantization; an inverse transform unit 105 which performs, for example, inverse DCT; an addition unit 106 which adds a previous prediction image and a subtracted image reconstructed by the inverse transform unit 105 to output a previous image; an inter prediction unit 107 which generates a prediction image by inter frame prediction; an intra prediction unit 108 which generates a prediction image by intra prediction; a switching unit 109 which selectively outputs the prediction image from the inter prediction unit 107 and the prediction image from the intra prediction unit 108; a coding control unit 100 which controls each function of the image coding apparatus 100; and a variable length coding unit 120 which performs variable length coding on the data from the quantization unit 103.

The coding control unit 110 holds a "target mode number" and a "variable length coding method" that should be applied to a coding target block (PU or a block included in the PU, and this is applied hereinafter) determined according to a predetermined evaluation standard. The evaluation standard is set, for example, so as to reduce the number of bits of code strings that are output under a condition for achieving a predetermined prediction accuracy.

According to the "target mode number" specified by the coding control unit 110, the intra prediction unit 108 predicts the pixel value of a current coding target block by utilizing a prediction pixel located in a direction specified by the intra prediction mode indicated by the target mode number. In addition, the intra prediction unit 108 codes the "target mode number" to generate the "coding mode number".

The variable length coding unit 120 performs entropy coding such as arithmetic coding of the "coding mode number" generated by the intra prediction unit 108, according to the "variable length coding method" specified by the coding control unit 110 so as to output a bit stream (bitStr).

[1-2. Procedure of Image Coding Method]

Figure 2:
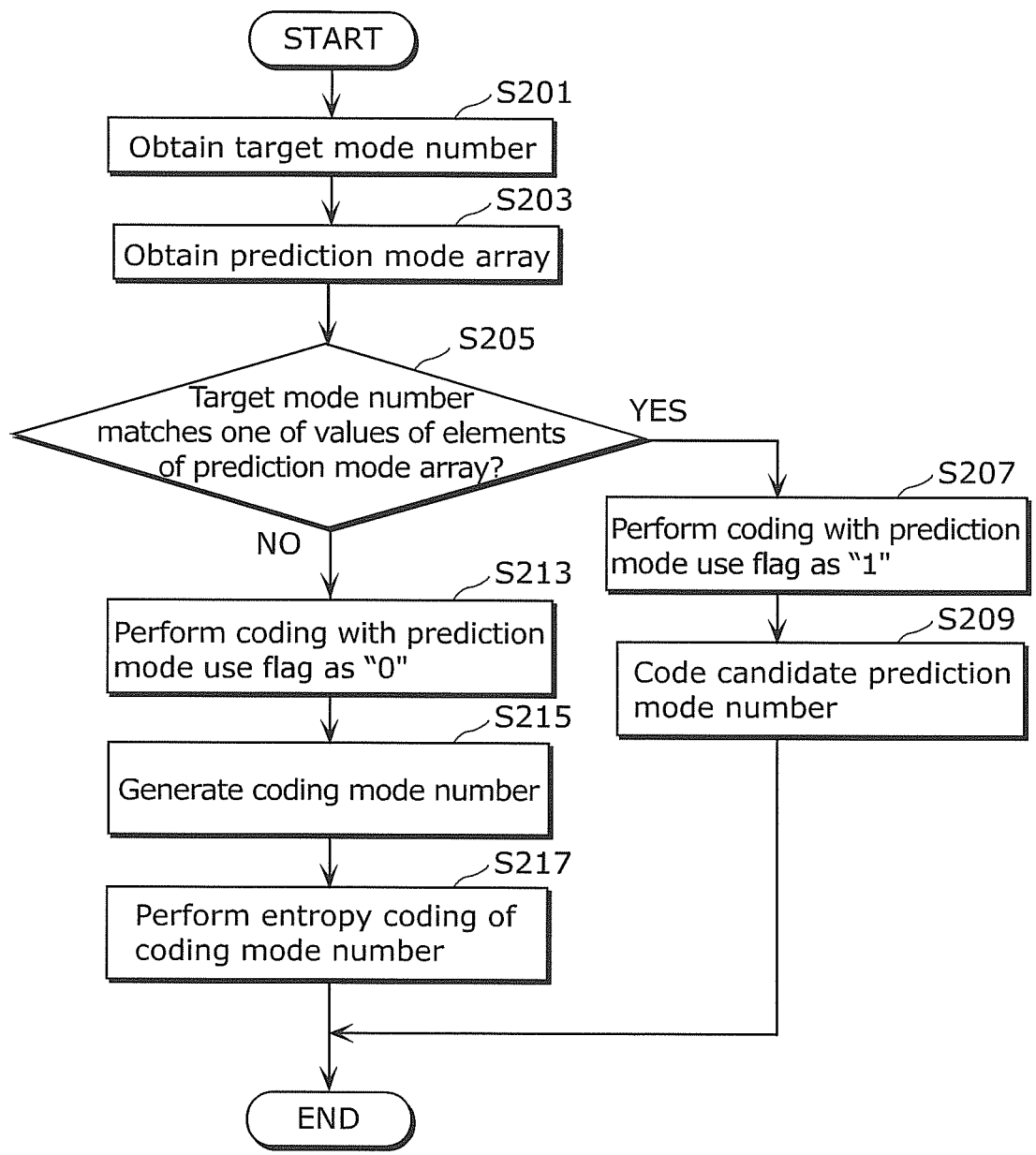
FIG. 2 is a flowchart of a mode information generating method in an image coding method according to Embodiment 1.

Referring to FIG. 2, a description is given of an image coding method according Embodiment 1. FIG. 2 is a flowchart of a mode information generating method executed by the image coding apparatus shown in FIG. 1.

The coding control unit 110 first obtains the "target mode number" of the coding target block for which mode information is generated (Step S201).

The coding control unit 110 then obtains candidate intra prediction modes for the coding target block to obtain a "prediction mode array" (candModeList) (Step S203). In Embodiment 1, the number of candidate intra prediction modes is fixed to two; and thus, the number of elements included in the prediction mode array is two. When the number of candidate intra prediction modes is fixed to three or more, the number of elements included in the prediction mode array equals the number of candidate intra prediction modes. When the number of candidate intra prediction modes is set to be variable, the number of elements in the prediction mode array equals the maximum number of candidate intra prediction modes.

The prediction mode array is an array in which each element has an index value (starting with 0) which is the "candidate prediction mode number" to be described later. The details of the method of obtaining the candidate intra prediction modes in this step will be described later with reference to FIG. 4.

Next, whether or not the target mode number matches the value of any one of the elements of the prediction mode array is determined (Step S205).

(Case where Target Mode Number Matches Value of any One of Elements of Prediction Mode Array)

When the determination in Step S205 shows that "the target mode number matches the value of any one of the elements of the prediction mode array" (YES in Step S205), the coding control unit 110 determines the value of the prediction mode use flag to be "1" (Step S207).

The coding control unit 110 performs variable length coding (Step S209) on the candidate prediction mode numbers (index values of the prediction mode array) according to a specified scheme, in order to identify the prediction mode used among the candidate intra prediction modes obtained in Step S203.

(Case where Target Mode Number does not Match Value of any One of Elements of Prediction Mode Array)

When the determination in Step S205 shows that "the target mode number does not match the value of any one of the elements of the prediction mode array" (NO in Step S205), the coding control unit 110 determines the "prediction mode use flag" to be 0 (Step S213).

The coding control unit 110 then generates, based on the target mode number and the number of candidate intra prediction modes, a "coding mode number" (the value of rem_intra_luma_pred_mode") (Step S215). In this step, different coding mode numbers are generated based on the target mode number and according to the number of candidate intra prediction modes, even in the case of the same target mode number. The step (S215) will be described later with reference to FIG. 3.

Lastly, the coding control unit 110 codes the coding mode number according the specified variable length coding method (Step S217). The step (S217) will be described later with reference to FIG. 5 (CABAC scheme) and FIG. 8 (CAVLC scheme).

[1-2-1. Example of Generation of Coding Mode Number]

Figure 3:
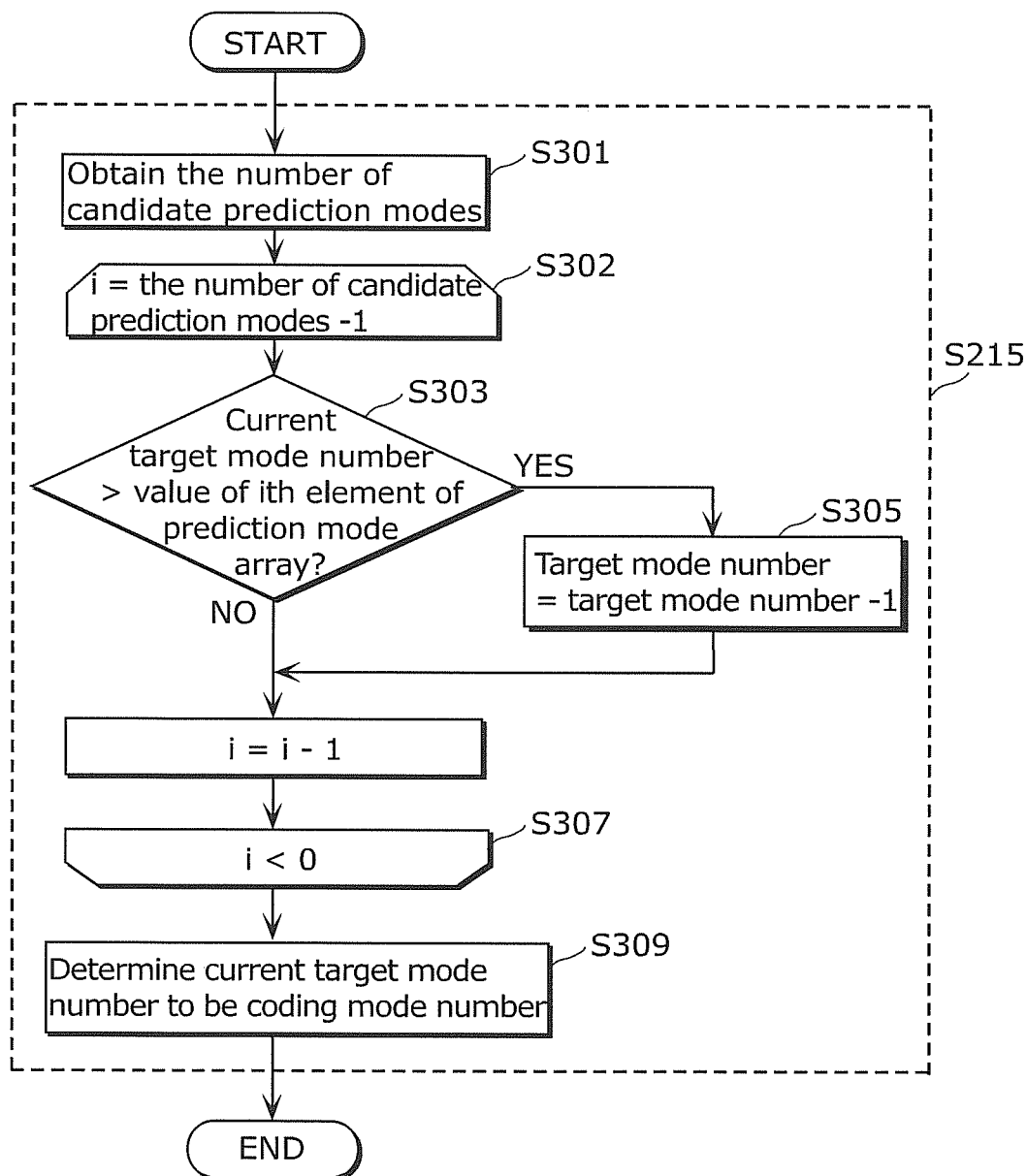
FIG. 3 is a flowchart of a detail of Step S215 in FIG. 2.

A description is given of an example of Step S215 for generating the coding mode number. FIG. 3 is a flowchart of an example of Step S215 for generating the coding mode number. The coding mode number may be generated by other methods.

First, the coding control unit 110 obtains the total number of intra prediction modes (the number of types of the intra prediction modes, which is 34 in Embodiment 1) and the number of candidate intra prediction modes (Step S301). In Embodiment 1, as described earlier, the number of candidate intra prediction modes is a fixed number that is two.

The coding control unit 110 repeats the loop specified as Step S302 to Step S307 by the number of times specified by the number of candidate intra prediction modes. In Embodiment 1, the number of candidate intra prediction modes is 2; and thus, Step S303 (and Step S305 depending on the determination in Step S303) is executed twice when the values of the indices (i) are 1 and 0. When the number of candidate prediction modes is N, Step S303 (and Step S305 depending on the determination in Step S303) is executed N times.

In Step S302, i is set to 0.

In Step S303, a determination is made on whether or not the value of the target mode number at a current time point is larger than the value of the element specified by the index (i) in the prediction mode array. When the determination shows that the value of the target mode number at the current time point is larger than the value of the specified element, the value of the target mode number at the current time point is decremented by 1 (Step S305).

This is repeated by the number of times specified by the value of the number of candidate intra prediction modes, and the current target mode number reflecting the result of the decrement or the like in Step S305 is finally determined to be the "coding mode number" (Step S309).

The processing of Step S215 is equivalent to, for example, determining, in association with the "coding mode number", the value of the "target mode number" which takes any one of the total thirty-four values from 0 to 33.

Table 1 shows the associations between (a) target mode numbers and (b) "coding mode numbers" in the case where the "number of candidate prediction modes" is two (where there are indices 0 and 1). In Table 1, (c) indicates process of Step S305 (a changed value from the current target mode number) when i=0, and (d) indicates that process of Step S305 (a changed value from the current target mode number) when i=1. In Table 1, candModeList[0] indicates the first element in the prediction mode array, and candModeList[1] indicates the second element in the prediction mode array.

of the second element of the prediction mode array (candModeList[0]<target mode number<candModeList[1]) is satisfied.

(3) The coding mode number is a number smaller than the target mode number by 2 when the value of the second element of the prediction mode array<target mode number (candModeList[1]<target mode number) is satisfied.

In other words, when the prediction mode array is composed of k number of elements (when there are k number of candidate intra prediction modes), it is possible to sort the elements based on the values in the prediction mode array, compare the target mode number with each of the elements arranged in the prediction mode array to determine the position of the element at which the target mode number is larger than the value in the prediction mode array. (k) The coding mode number is smaller than the target mode number by k−1 when the value of the (k−1)th element of the prediction mode array<target mode number<the value of the kth element (when candModeList[K−1]<target mode number<candModeList[k]) is satisfied.

[1-2-2. Method of Generating Prediction Mode Array]

Figure 4:
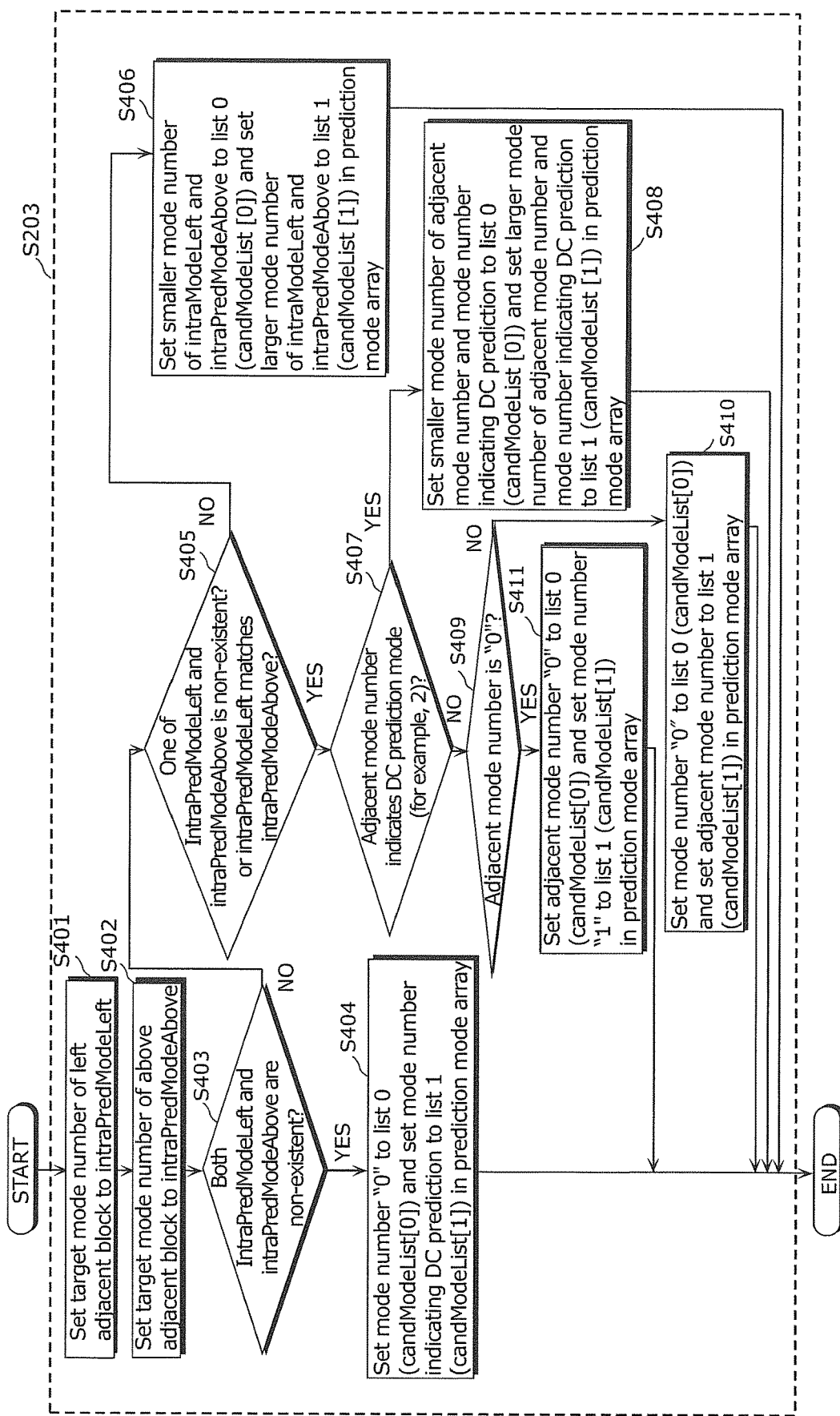
FIG. 4 is a flowchart of a prediction mode determining method according to Embodiment 1.

Referring to FIG. 4, a description is given of a method of determining a "prediction mode array" (candModeList). FIG. 4 is a flowchart of a detail of the prediction mode array obtaining step (Step S203) shown in FIG. 2. Here, a description is given of the case where the "prediction mode array" (candModeList) of the coding target block is determined when the number of the candidate intra prediction modes is fixed to two.

In Embodiment 1, the target mode numbers of adjacent blocks that have already been coded are used as the elements of the "prediction mode array" (candModeList). In the case where the number of target mode numbers of adjacent blocks that have already been coded is less than the number of elements of the prediction mode array as in the case where the target mode numbers of adjacent blocks match one another (the matched target mode number is assumed to be one candidate intra prediction mode), candidate intra prediction modes are determined from intra prediction modes other than the target mode numbers of adjacent blocks, such

TABLE 1

| (a) Target mode number 0 ... 33 | 0 | 1 | 2 | ... | CandModeList[0] | ... | CandModeList[1] | ... | 33 |
|---|---|---|---|---|---|---|---|---|---|
| (c)S305 (i = 0) | 0 | 0 | 0 | 0 | Yes (S205) | −1 | −1 | | −1 | −1 |
| (d)S305 (i = 1) | 0 | 0 | 0 | 0 | 0 | 0 | Yes (S205) | | −1 | −1 |
| (b) Coding mode number (0 ... 31) | 0 | 1 | 2 | ... | Unnecessary (S205) | ... | Unnecessary (S205) | ... | 31 |

From Table 1, the coding mode number can be derived as described below according to the value of the target mode number.

(1) The target mode number matches the coding mode number when 0≤target mode number<the value of the first element of the prediction mode array (0≤target mode number<candModeList[0]) is satisfied.

(2) The coding mode number is a number smaller than the target mode number by 1 when the value of the first element of the prediction mode array<target mode number<the value as DC prediction mode, plane prediction (intra planar), and vertical prediction (intra angular).

The coding control unit 110 sets the target mode number of the already coded block to the left of the coding target block to intraPredModeLeft (Step S401).

More specifically, for example, when the left adjacent block is coded using intra prediction, the target mode number used in the coding (decoding) is set to intraPredModeLeft. When the left adjacent block is coded using a coding method other than intra prediction (for example, inter frame coding), the intra prediction mode number (for example, "2") indicating DC prediction mode (indicated as DC prediction in FIG. 4) is set to intraPredModeLeft. When it is determined that the left adjacent block does not exist (for example, in the case of slice boundary or picture edge), Not Available is set to intraPredModeLeft.

In the similar manner, the coding control unit 110 sets the target mode number of the already coded block above the coding target block to intraPredModeAbove (Step S402). The method for setting intraPredModeAbove is the same as the processing performed on the left adjacent block (Step S401) other than the position of the block.

After setting intraPredModeLeft and intraPredModeAbove, the coding control unit 110 determines if the target mode numbers of the left and above adjacent blocks are non-existent (if both of intraPredModeLeft and intraPredModeAbove indicate Not Available) (Step S403).

Here, in the case of YES in Step S403 (where both of the left and above adjacent blocks are non-existent), the coding control unit 110 sets an intra prediction mode number "0" to list 0 (candModeList[0]) that is the first element of the "prediction mode array" (candModeList) of the coding target block and sets an intra prediction mode number indicating DC prediction mode (for example, "2") is set to list 1 (candModeList[1]) that is the second element of the "prediction mode array" (Step S404).

In the case of NO in Step S403, the coding control unit 110 determines if one of intraPredModeLeft and intraPredModeAbove is non-existent, or whether or not intraPredModeLeft and intraPredModeAbove match one another (Step S405).

In the case of No in Step S405 (when the target mode numbers of both of the left and above adjacent blocks exist but they do not match one another), the coding control unit 110 sets, to list 0 (candModeList[0]) of the "prediction mode array" (candModeList) of the coding target block, the target mode number which is the smaller of the target mode number of the left adjacent block and the target mode number of the above adjacent block. The coding control unit 110 further sets, to list 1 (candModeList[1]), the target mode number which is the larger of the target mode number of the left adjacent block and the target mode number of the above adjacent block (Step S406).

In the case of YES in Step S405 (where only one of the target mode numbers of the left and above adjacent blocks exists, or where the target mode numbers of the left and above adjacent blocks match one another), the coding control unit 110 determines whether the matched target mode number or the target mode number which exists (hereinafter, referred to as "adjacent mode number") is an intra prediction mode number (for example, "2") which indicates DC prediction mode (Step S407).

In the case of Yes in Step S407 (where the adjacent mode number is an intra prediction mode number which indicates DC prediction mode), the coding control unit 110 sets, to list 0 (candModeList[0]) in the "prediction mode array" (candModeList) of the coding target block, the intra prediction mode number which is the smaller of the adjacent mode number (the matched target mode number or the target mode number which exists) and the intra prediction mode number which indicates DC prediction mode. The coding control unit 110 further sets, to list 1 (candModeList[1]), the intra prediction mode number which is the larger of the adjacent mode number (the matched target mode number or the target mode number which exists) and the intra prediction mode number which indicates DC prediction mode (Step S408).

In the case of NO in Step S407 (where the adjacent mode number is not the intra prediction mode number (for example, "2") which indicates DC prediction mode), the coding control unit 110 determines whether or not the adjacent mode number is "0" (Step S409).

In the case of NO in Step S409 (where the adjacent mode number is not "0"), the coding control unit 110 sets an intra prediction mode number "0" to list 0 (candModeList[0]), and sets the adjacent mode number to list 1 (candModeList[1]), in the "prediction mode array" (candModeList) of the coding target block (Step S410).

In case of YES in Step S409 (where the adjacent mode number is "0"), the coding control unit 110 sets the adjacent mode number "0" to list 0 (candModeList[0]), and sets an intra prediction mode number "1" to list 1 (candModeList[1]), in the "prediction mode array" (candModeList) of the coding target block (Step S411).

In Steps S408 to S411, the DC prediction mode number and the intra prediction mode numbers "0" and "1" are preferentially assigned to each element of the prediction mode array. As a result, as shown in Table 1 above, the coding mode numbers can be made smaller, leading to an increase in the coding efficiency.

The preferential order here (DC prediction mode number, intra prediction mode numbers "0" and "1") is merely an example. By prioritizing the smaller intra prediction mode number, it is possible to increase the coding efficiency even when the priority of the DC prediction mode is lowered.

[1-2-3. Coding of Coding Mode Number]

Figure 5:
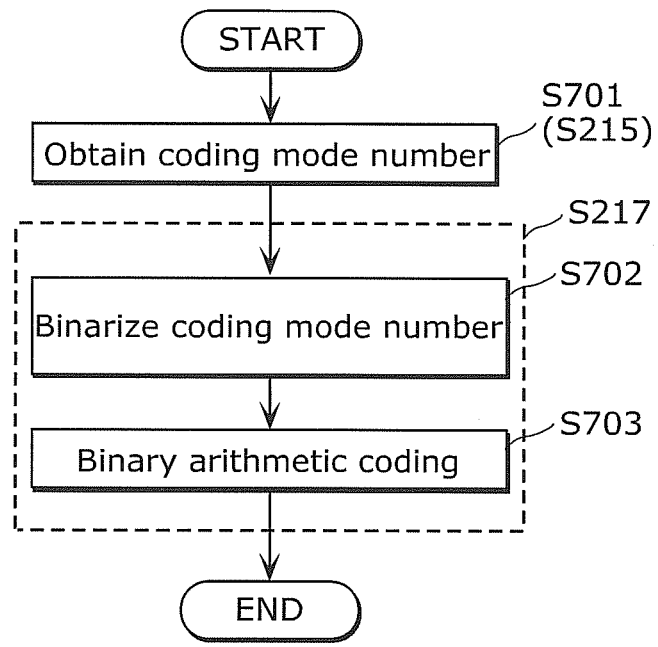
FIG. 5 is a flowchart of an example of a method of coding a coding mode number according to a CABAC scheme (Step S217)

Referring to FIG. 5, a description is given of an example of Step S217 for coding the coding mode number. The coding in the example is performed according to a specified variable length coding and the CABAC scheme. FIG. 5 is a flowchart of a coding method according to the CABAC scheme.

The coding control unit 110 obtains a coding mode number, for example, according to the method shown in FIG. 3 (Step S701 and Step S215), and performs binarizing process on the obtained coding mode number according to a binarizing method corresponding to the total number of intra prediction modes (the maximum number of modes) (Step S702). This means that, for example, in the case where the maximum number of modes varies depending on the coding unit of the intra prediction mode (for example, 17 modes when the coding unit is size 4×4, and 34 modes when the coding unit is size 8×8 or larger), binarizing processing is performed corresponding to the size.

The coding control unit 110 performs binary arithmetic coding on the signal in which the coding mode number is binarized (Step S703). This allows the coding mode number to be recorded on the stream.

Referring to FIG. 6A and FIG. 6B, descriptions are given of syntax examples showing specific data structure. FIG. 6A is a conceptual diagram illustrating an example of a syntax structure, extracted from NPL 1, which indicates a data structure storing target mode numbers. FIG. 6B is a conceptual diagram illustrating an example of a syntax structure according to Embodiment 1.

Portions not particularly mentioned here are assumed to operate as mentioned in NPL 1. In the conventional syntax structure, a prediction mode use flag (prev_intra_luma_pred_flag) is first coded.

When the prediction mode use flag indicates 1, it is determined whether the number of candidate intra prediction modes (NumMPMCand) is larger than one (901). When the number of candidate intra prediction modes (NumMPMCand) is larger than one (two or more), the candidate prediction mode number (mpm_idx) is coded.

When the prediction mode use flag indicates 0, the coding mode number (rem_intra_luma_pred_mode) is coded.

In the configuration according to the present disclosure, the number of candidate intra prediction modes is fixed to at least two or more; and thus, the conditional expression 901 "if(NumMPMCand>1)" in FIG. 6A is unnecessary, resulting in the bit stream having the syntax structure shown in FIG. 6B. In other words, when the prediction mode use flag is 1, the candidate prediction mode number (mpm_idx) is always coded. This results in less conditional branching, allowing the generation of a bitstream which can be decoded with reduced processing amount. Although not shown in the drawings, conventionally, after Step S207 in FIG. 2, process is performed for determining whether or not the target mode number of the left adjacent block matches the target mode number of the above adjacent block. When the target mode numbers match one another, Step S209 is performed.

Variation of Embodiment 1

(Variation 1: Variation of Prediction Mode Determining Method)

The method of determining the prediction mode array described with reference to FIG. 4 may be varied as follows.

In Variation 1, aside from the target mode numbers used for the adjacent blocks, an intra prediction mode number which has the highest probability of occurrence for a coding target block is selected as a most frequent mode number. Then, the most frequent mode number is replaced with one of the "DC prediction mode 2", "mode number 0" and "mode number 1" shown in FIG. 4.

For selecting the most frequent mode number, for example, the intra prediction mode number having the minimum code length may be selected according to the context state used in the arithmetic coding in Step S703 of FIG. 5. Furthermore, for example, the intra prediction mode number assigned to the minimum bit length according to the variable length table used in Steps S502 and S503 of FIG. 8 that will be described later, may be determined as the most frequent mode number. It may also be that the most frequent mode number is selected according to a totally different method (for example, statistically deriving the most frequent mode number from histories of adjacent mode numbers and cumulative target mode numbers). The first two methods can increase the coding efficiency without increasing the processing amount by sharing the existing steps. The last method is expected to significantly increase the coding efficiency although the processing amount slightly increases.

Figure 7:
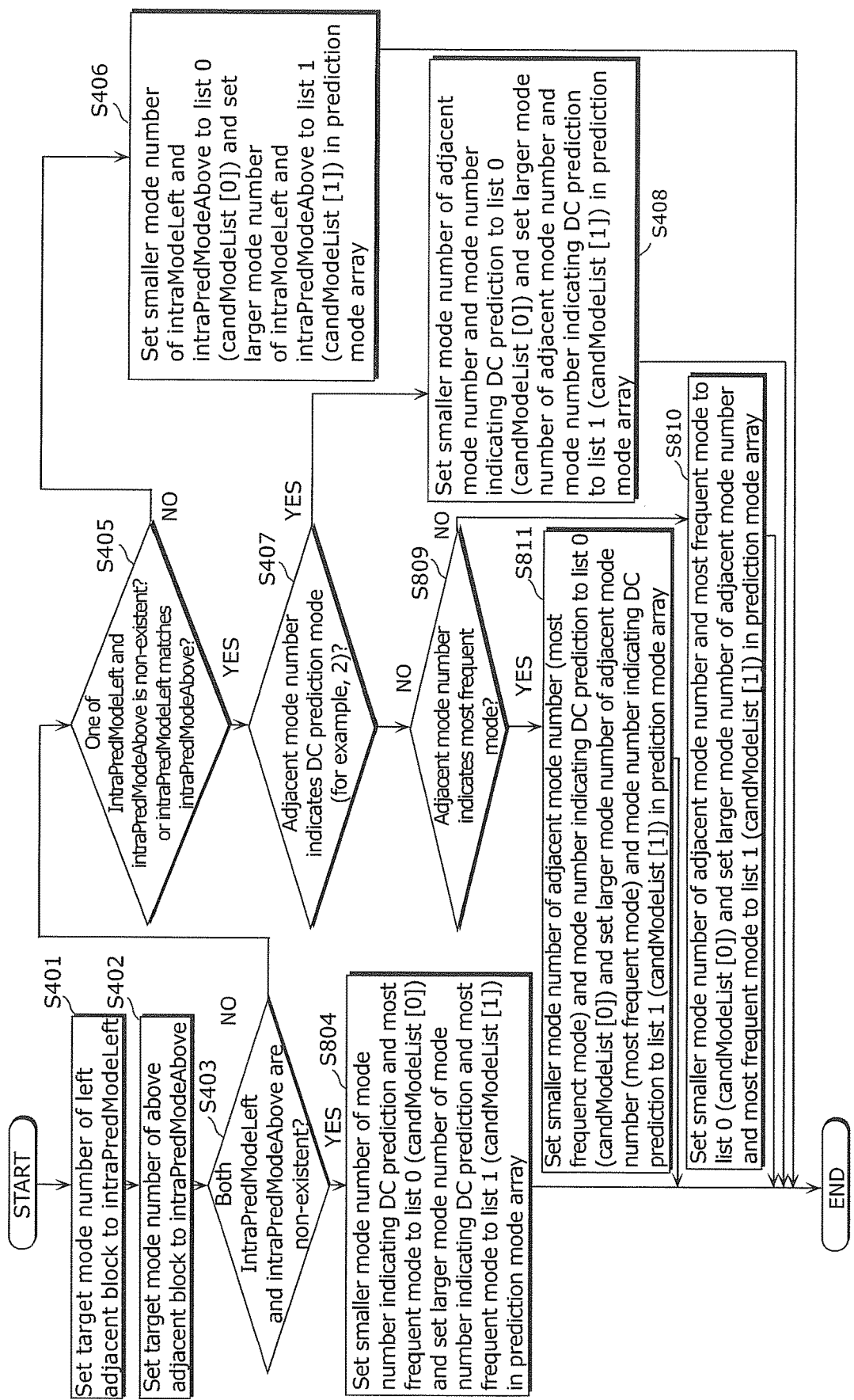
FIG. 7 is a flowchart of a variation of the prediction mode determining method according to Embodiment 1.

Referring to FIG. 7, a description is given of a method of determining a prediction mode array using the most frequent mode number. FIG. 7 is a flowchart of an example of the step for determining the prediction mode array (Step S203). The procedure shown in the flowchart of FIG. 7 is a variation of the procedure shown in the flowchart of FIG. 4. The Steps (Steps S401 to S403 and S405 to S408) in FIG. 7 are the same as those in FIG. 4, other than Step S404 (Step S804) Step S409 (Step S809), Step S410 (Step S810), and Step S411 (Step S811). Thus, descriptions of the duplicated steps may be omitted appropriately.

Here, a description is given of the case where the "prediction mode array" (candModeList) of the coding target block is determined when the number of the candidate intra prediction modes is fixed to two.

The coding control unit 110 sets, to intraPredModeLeft, the target mode number of the already coded block to the left of the coding target block (Step S401), and set, to intraPredModeAbove, the target mode number of the already coded block above the coding target block (Step S402).

After setting intraPredModeLeft and intraPredModeAbove, the coding control unit 110 determines if the target mode numbers of the left and above adjacent blocks are non-existent (if both of intraPredModeLeft and intraPredModeAbove indicate Not Available) (Step S403).

In the case of YES in Step S403 (where both of the left and above adjacent blocks are non-existent), the coding control unit 110 sets, to list 0 (candModeList[0]) in the "prediction mode array" of the coding target block, the intra prediction mode number which is the smaller of the most frequent mode number and the intra prediction mode number indicating DC prediction mode (for example, "2"). The coding control unit 110 further sets, to list 1 (candModeList[1]), the intra prediction mode number which is the larger of the most frequent mode number and the intra prediction mode number indicating DC prediction mode (for example, "2") (Step S804).

In the case of NO in Step S403, the coding control unit 110 determines if one of intraPredModeLeft and intraPredModeAbove is non-existent, or whether or not intraPredModeLeft and intraPredModeAbove match one another (Step S405).

In the case of NO in Step S405 (where the target mode numbers of both of the left and above adjacent blocks exist but they do not match one another), the coding control unit 110 sets, to list 0 (candModeList[0]) of the "prediction mode array" (candModeList) of the coding target block, the target mode number which is the smaller of the target mode number of the left adjacent block and the target mode number of the above adjacent block. The coding control unit 110 further sets, to list 1 (candModeList[1]), the target mode number which is the larger of the target mode number of the left adjacent block and the target mode number of the above adjacent block (Step S406).

In the case of YES in Step S405 (where only one of the target mode numbers of the left and above adjacent blocks exists, or where the target mode numbers of the left and above adjacent blocks match one another), the coding control unit 110 determines whether the matched target mode number or the target mode number which exists (adjacent mode number) is an intra prediction mode number (for example, "2") which indicates DC prediction mode (Step S407).

In the case of Yes in S407 (where the adjacent mode number is an intra prediction mode number which indicates DC prediction mode), the coding control unit 110 sets, to list 0 (candModeList[0]) in the "prediction mode array" (candModeList) of the coding target block, the intra prediction mode number which is the smaller of the adjacent mode number (the matched target mode number or the target mode number which exists) and the intra prediction mode number which indicates DC prediction mode. The coding control unit 110 further sets, to list 1 (candModeList[1]), the intra prediction mode number which is the larger of the adjacent mode number (the matched target mode number or the target mode number which exists) and the intra prediction mode number which indicates DC prediction mode (Step S408).

In the case of NO in Step S407 (where the adjacent mode number is not the intra prediction mode number (for example, "2") which indicates DC prediction mode), the coding control unit 110 determines whether or not the adjacent mode number is the most frequent mode number (Step S809).

In the case of NO in Step S809 (where the adjacent mode number is not the most frequent mode number), the coding control unit 110 sets, to list 0 (candModeList[0]), the intra prediction mode number which is the smaller of the most frequent mode number and the adjacent mode number, and sets, to list 1 (candModeList[1]), the intra prediction mode number which is the larger of the most frequent mode number and the adjacent mode number, in the "prediction mode array" of the coding target block (Step S810).

In the case of YES in Step S809 (where the adjacent mode number is the most frequent mode number), the coding control unit 110 sets, to list 0 (candModeList[0]), the intra prediction mode number which is the smaller of the adjacent mode number (=most frequent mode number) and the intra prediction mode number indicating DC prediction mode, and sets, to list 1 (candModeList[1]), the intra prediction mode number which is the larger of the adjacent mode number (=most frequent mode number) and the intra prediction mode number indicating DC prediction mode, in the "prediction mode array" of the coding target block (Step S811).

In Steps S809 to S811, as described above, the most frequent mode number and the DC prediction mode number are preferentially assigned to respective elements of the prediction mode array. As a result, it is possible to increase matching ratio to the intra prediction mode. In addition, as shown in Table 1, coding mode numbers can be made smaller, leading to an increase in the coding efficiency.

The preferential order here (the preferential order of DC prediction mode number, most frequent mode number, and intra prediction mode number "0") is merely an example, and may be changed based on the statistical information. The intra prediction mode number "0" indicates, for example, plane prediction (intra planar) and vertical prediction (intra angular).

(Variation 2: Variation of Coding of Coding Mode Number)

Figures 8, 9A:
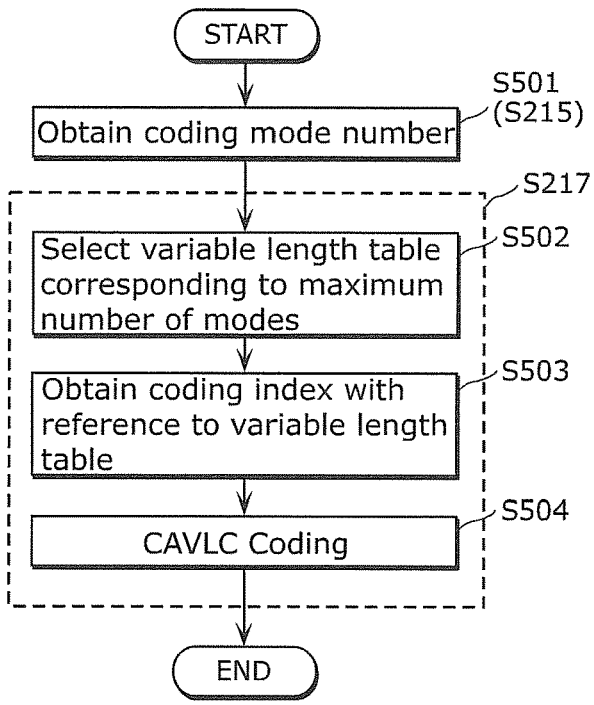
FIG. 8 is a flowchart of an example of another method of coding the coding mode number (Step S217)
FIG. 9A is an example of a coding table used in the another method of coding the coding mode number (Step S217)

Coding of the coding mode numbers may be performed according to not only the CABAC scheme, but also a CAVLC scheme. Hereinafter, the coding method according to the CAVLC scheme will be described with reference to FIG. 8, FIG. 9A and FIG. 9B. FIG. 8 is a flowchart of a coding method according to the CAVLC scheme. FIG. 9A is an example of a coding table when the maximum number of modes (total number of intra prediction modes) is 17. FIG. 9B is an example of a coding table when the maximum number of modes is 34.

The coding control unit 110 obtains a coding mode number (Step S501), for example, according to the method shown in FIG. 3, and selects a variable length table (not shown) corresponding to the maximum number of modes (Step S502). This means that in the case where, for example, the maximum number of modes varies depending on the size of the coding unit (for example, 17 modes for the coding unit size of 4×4 and 34 modes for the coding unit size of 8×8 or larger), the variable length table which corresponds to the coding unit size is selected.

According to Embodiment 1, it is sufficient that one kind of variable length table is used for each coding unit; and thus, the memory amount necessary for a coding apparatus can be reduced.

The coding control unit 110 derives a coding index number from the coding mode number using the selected variable length table (Step S503). The variable length table is updated per block, large block or slice basis such that the coding index number decreases as the frequency of the coding mode number increases. Thus, the variable length coding process, which will be described later, is performed such that the code length decreases as the coding index number decreases.

Lastly, the coding control unit 110 codes the derived coding index number using a predetermined coding table (Step S504).

In the process in FIG. 2, setting of the prediction mode use flag (Step S207) and coding of the coding mode number (Step 209) are performed separately. However, an example is given here of a case where the coding mode number is coded including the prediction mode flag in the CAVLC scheme.

In FIG. 9A and FIG. 9B, MPM1 indicates the case where the prediction mode use flag=1 and the candidate prediction mode number is 0. In this case, MPM1 has a code "10". MPM2 indicates the case where the prediction mode use flag=1 and the candidate prediction mode number is 0. In this case, MPM 2 has a code "11". The following left numbers 0 to 14 (corresponding to 15 modes obtained by subtracting 2 modes from 17 modes as this is the example where the number of candidate intra prediction modes is two), and 0 to 31 (corresponding to 32 modes obtained by subtracting 2 modes from 34 modes as this is the example where the number of candidate intra prediction modes is two) indicate the coding mode numbers derived in (Step S503). The right codes indicate code strings written to bit streams.

This method allows all mode information to be coded in the same mechanism, reducing the necessary memory amount.

In the same manner as the flow shown in FIG. 2, the prediction mode use flag and the coding mode number may be separately coded. In this case, with the code for MPM1 being 1 and the prediction mode use flag=1, 1 bit index may be coded for the prediction mode number.

For the coding according to the CAVCL scheme, a vlc table may be referred to which is shared between prediction mode use flag (prev_intra_luma_pred_flag), the candidate prediction mode number (mpm_idx), and the coding mode number (rem_intra_luma_pred_mode).

Embodiment 2

Referring to FIG. 10 to FIG. 15, descriptions are given of an image decoding method and an image decoding apparatus which executes the image decoding method according to Embodiment 2.

In the image decoding method according to Embodiment 2, arithmetic decoding is performed using only the result of the arithmetic decoding performed on the bit stream of a decoding target block. In arithmetic decoding process, information amount of 1 bit to a few bits may be reconstructed, making it difficult to secure buffer amount and to perform real-time processing. However, the image decoding method according to Embodiment 2 does not use information of other decoding target blocks, resulting in reducing internal memory amount necessary for calculation and reducing processing time.

[2-1. Configuration of Image Decoding Apparatus]

Figure 10:
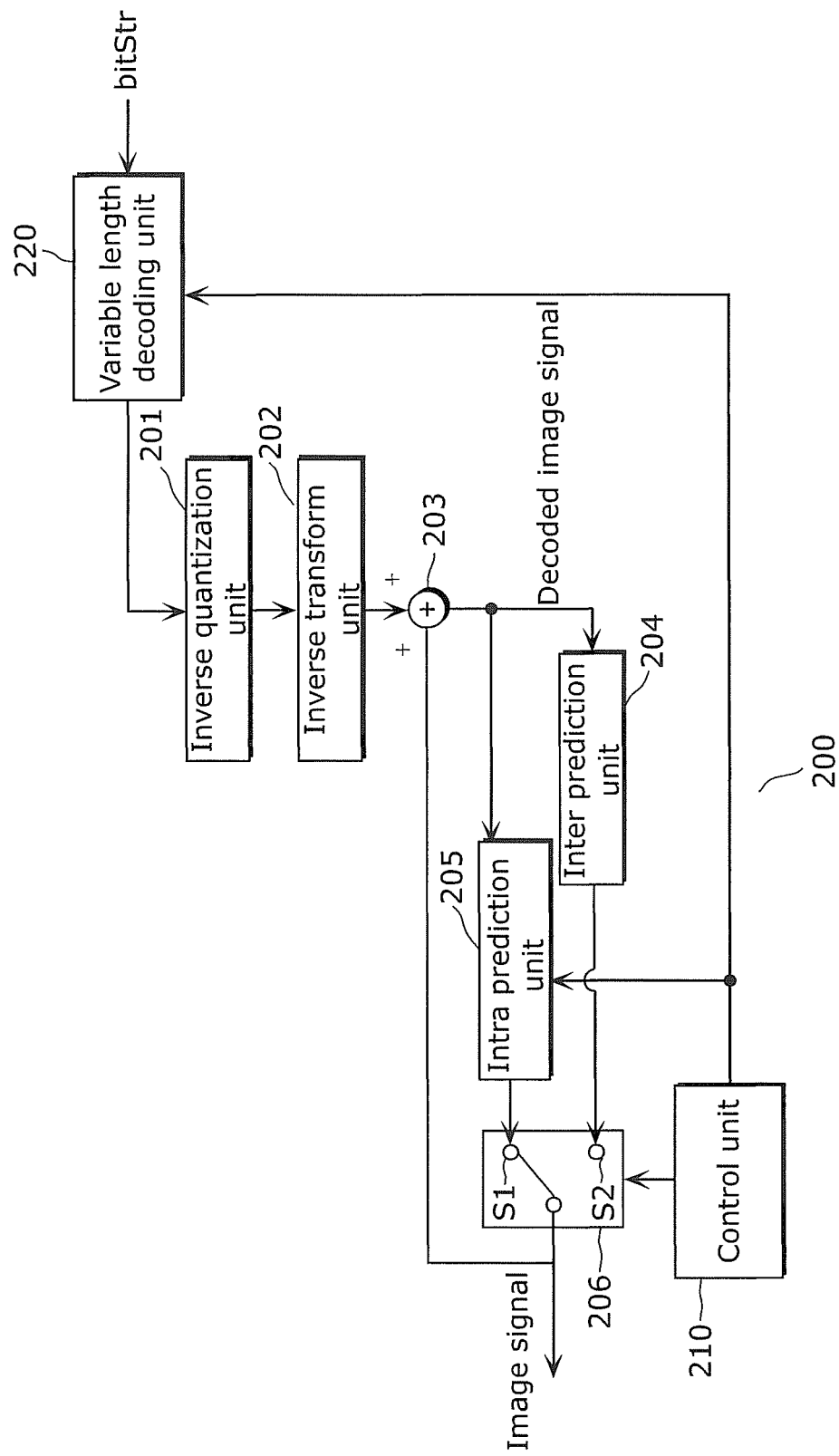
FIG. 10 is a block diagram illustrating a configuration of a decoding apparatus 2 according to Embodiment 2.

Referring to FIG. 10, a description is given of a configuration of the image decoding apparatus according to Embodiment 2. FIG. 10 is a block diagram illustrating a configuration of an image decoding apparatus 200.

The image decoding apparatus 200 is an apparatus which receives an input of a bit stream (bitStr), and outputs an image signal. In the present disclosure, an example is given of a case where a bit stream (bitStr) to be input is generated by the image coding method according to Embodiment 1. For the bit stream to which a code string shown in FIG. 9A or FIG. 9B is written, following the definition of Prediction Unit Syntax from left to right in FIG. 9A or FIG. 9B in a sense of data structure, variable length decoding (Step S1117) of the right part is performed, a "coding mode number" (rem_intra_luma_pred_mode) is obtained (Step S1115), and a "target mode number" is obtained.

The image decoding apparatus 200 includes: a variable length decoding unit 220, an inverse quantization unit 201, an inverse transform unit 202, an addition unit which adds a previous prediction image and a subtracted image, an inter prediction unit 204 which generates a prediction image by inter frame prediction, an intra prediction unit 205 which generates a prediction image by intra prediction, a switching unit 206 which selectively outputs the prediction image from the inter prediction unit 204 and the prediction image from the intra prediction unit 205, a control unit 210, and so on.

The variable length decoding unit 220 performs operations inverse to operations by the variable length coding unit 120. In other words, the variable length decoding unit 220 receives an input of the bit stream, and obtains a "coding mode number" etc. from the bit stream according to the number of candidates for the intra prediction mode (NumMPMCand). Furthermore, the variable length decoding unit 220 obtains a "target mode number" from the "coding mode number".

The intra prediction unit 205 performs approximately the same operations as operations by the intra prediction unit 108 in FIG. 1. According to the obtained "target mode number", the intra prediction unit 205 predicts the pixel value of a current decoding target block by utilizing a prediction pixel located in a direction specified by an intra prediction mode corresponding to the target mode number.

The control unit 210 provides information necessary for obtaining the target mode number to the variable length decoding unit 220. The necessary information in the decoding method according to the present disclosure may be any information for reproducing the "target mode number" from the bit stream output as a result of the coding according to Embodiment 1. For example, when the variable length decoding unit 220 does not hold such information, a prediction mode array (candModeList) about the decoding target block (or an initial value of this list) is provided thereto. In addition, an entropy decoding mode (for example, a bit string output according to the CAVLC scheme or a bit string output according to the CABAC scheme) is provided for each predetermined unit associated with the current decoding target block.

[2-2. Procedure of Image Decoding Method]

Figure 11:
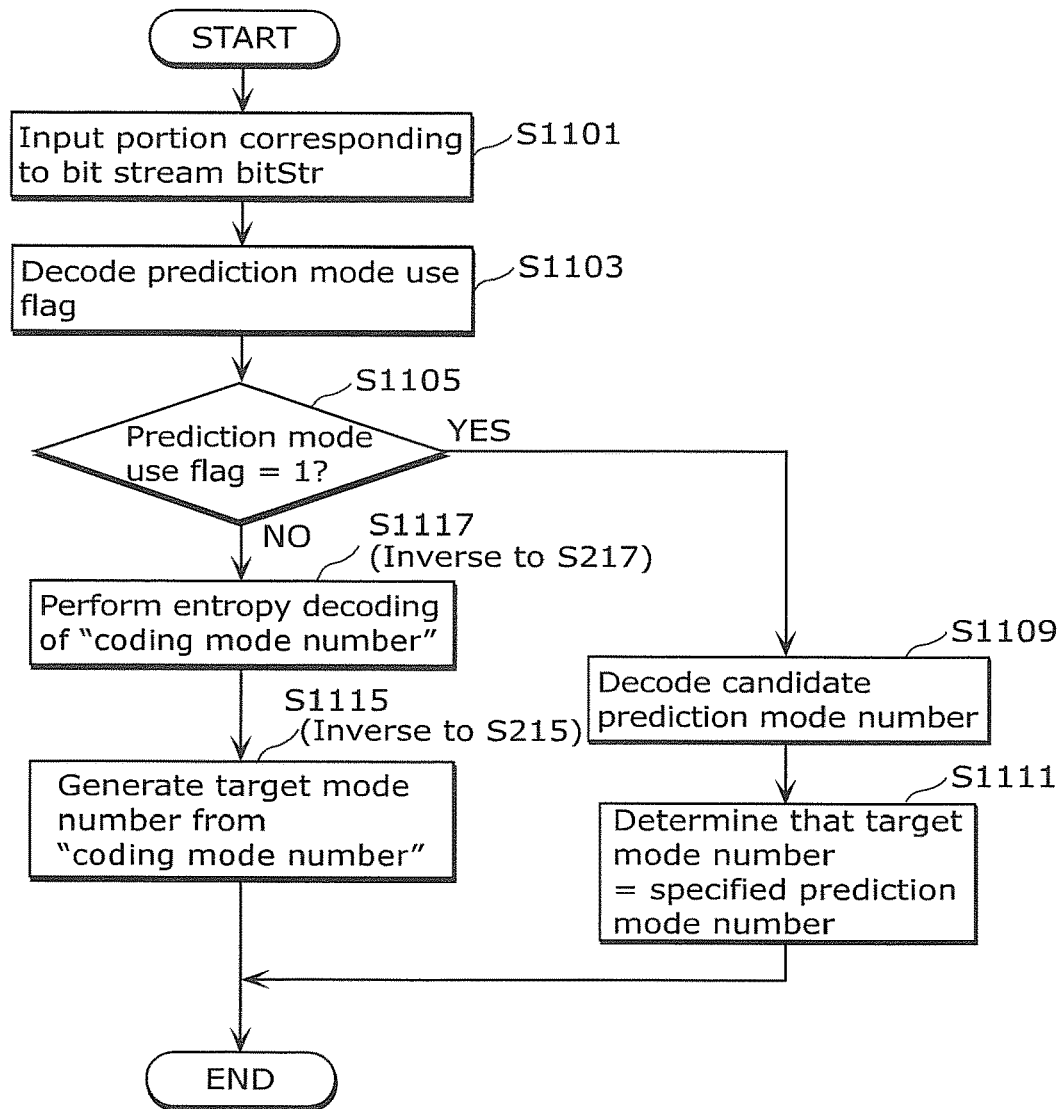
FIG. 11 is a flowchart of a decoding method according to Embodiment 2.

Referring to FIG. 11, a description is given of the image decoding method according Embodiment 2. FIG. 11 is a flowchart of a method of decoding a "target mode number" (34 intra prediction modes shown in FIG. 15) executed by the image decoding apparatus in FIG. 10. In Embodiment 2, a description is given of an example where each step is executed by the variable length decoding unit 220; however, each step may be executed by, for example, the control unit 210.

First, the variable length decoding unit 220 extracts a portion corresponding to mode information of a decoding target block from the bit stream (bitStr) coded by the coding method according to Embodiment 1. The corresponding portion is a bit string obtained by performing entropy coding on one of (1) a "prediction mode use flag" (prev_intra_luma_pred_flag), (2) a "candidate prediction mode number" (mpm_idx), and (3) a "coding mode number" (rem_intra_lyma_pred_mode) which are structured according to a syntax (Prediction unit syntax) explained with reference to FIGS. 6A and 6B.

After obtaining the bit string, the variable length decoding unit 220 decodes the bit string according to the syntax in FIG. 6A or FIG. 6B to obtain the "target mode number" (Step S1103 to Step S1115).

The variable length decoding unit 220 first reconstructs the value of the "prediction mode use flag" (prev_intra_luma_pred_flag) according to a predetermined entropy decoding method (Step S1103). Hereinafter, unless specifically explained, the following descriptions, the words in the diagrams, and the values have the same meaning as those in the coding method according to Embodiment 1 and the descriptions about the syntax in FIGS. 6A and 6B.

The variable length decoding unit 220 determines whether or not the decoded prediction mode use flag indicates 1 (Step S1105).

In the case of YES in Step S1105 (where the value of the "prediction mode use flag" indicates 1), the variable length decoding unit 220 decodes the "candidate prediction mode number" (mpm_idx) (Step S1109).

More specifically, the variable length decoding unit 220 generates a prediction mode array (candModeList), and determines, as the "target mode number", the value (candModeList [mpm_idx]) of the element having the element number (mpm_idx) in the prediction mode array (candModeList) (Step S1111). For generating the prediction mode array, the method described with reference to FIG. 4 or FIG. 7 according to Embodiment 1 may be used. It is assumed that the same prediction mode array generating method is used between the coding apparatus and the decoding apparatus.

In the case of NO in Step S1105 (where the value of the "prediction mode use flag" is not 1), the variable length decoding unit 220 performs entropy decoding on the coding mode number. More specifically, the variable length decoding unit 220 first obtains the coding mode number from the bit string according to the total number of intra prediction modes (the maximum number of modes) (Step S1117). This obtainment process is inverse to the process in Step S217 in FIG. 2. Different processes are performed depending on whether the corresponding bit string is output according to a (1) CABAC scheme (FIG. 5) or a (2) CAVLC scheme (FIG. 8) as the entropy coding scheme. The entropy coding scheme is determined, for example, based on the value indicated by an entropy coding mode flag of a predetermined unit corresponding to a prediction unit (PU) associated with a decoding target block. The flag may be identified in a higher sequence unit.

Figure 12A:
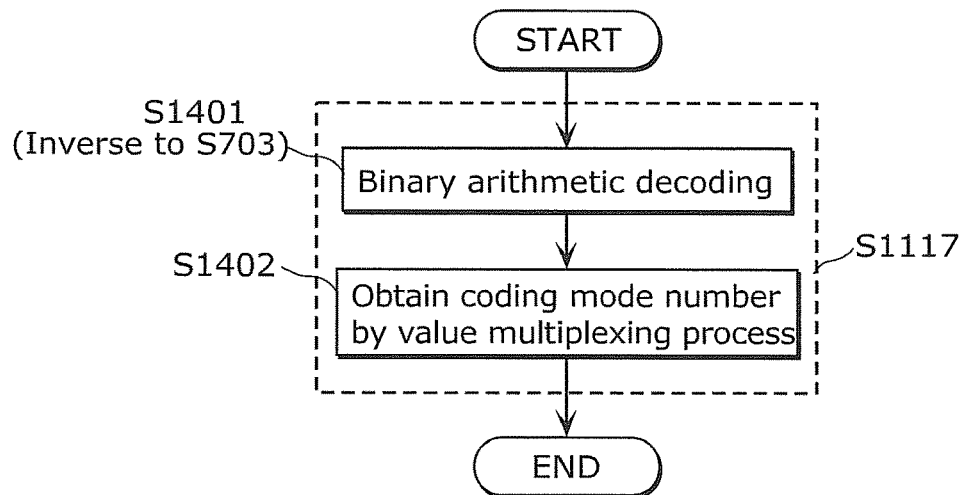
FIG. 12A is a flowchart of an arithmetic decoding processing performed when a bit string is output according to the CABAC scheme.

First, a description is given of a case where the bit string is output according to the (1) CABAC scheme, with reference to FIG. 12A. FIG. 12A is a flowchart of arithmetic decoding process corresponding to Step S1117 in FIG. 11.

The variable length decoding unit 220 first performs arithmetic decoding on the obtained bit stream (Step S1401, inverse to Step S703). The variable length decoding unit 220 performs value multiplexing process on the binary information obtained by the arithmetic decoding to reconstruct to the coding mode number (Step S1402).

Figure 13:
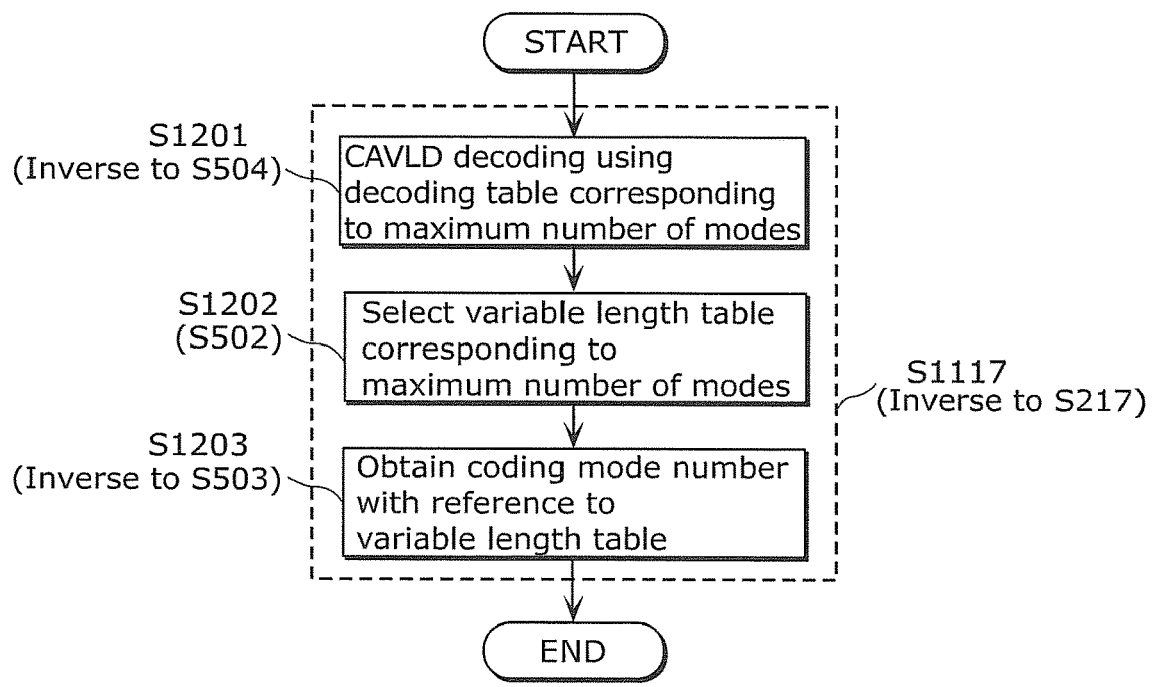
FIG. 13 is a flowchart of a detail of a first example of Step S1117.

Next, a description is given of a case where the bit string is output according to the (2) CAVLC scheme, with reference to FIG. 13. FIG. 13 is a flowchart of a method of obtaining the "coding mode number" in Step S1117 when the bit string is output according to the CAVLC scheme.

The variable length decoding unit 220 first obtains a coding index number from the bit string using information (context) necessary for decoding the "coding mode number" of the decoding target block (PU) (Step S1201). The decoding process corresponds to the process inverse to the coding process in Step S504 in FIG. 8. More specifically, a variable length coding (variable length decoding) table shown in FIG. 9A or FIG. 9B is selected according to the maximum number of modes (for example, 17 modes or 34 modes depending on the transmission unit of the prediction information described in Embodiment 1). From bit strings in the selected variable length coding table, the bit string corresponding to the input bit stream (bit string shown at the right side in FIG. 9A or FIG. 9B) is searched for, and the coding index number (corresponds to the number shown at the left side in FIG. 9A or FIG. 9B) associated with the bit string is obtained.

The variable length decoding unit 220 then selects different variable length tables for each maximum number of modes in the similar manner as described above (Step S1202 which is the same as Step S502, not shown), and derives the coding mode number associated with the obtained coding index number, using the selected variable length table (S1203 which is the processing inverse to Step S503). The variable length table is updated per block, large block, or slice basis such that the coding index number decreases as the frequency of the coding mode number increases. The update is performed according to a method predetermined between the coding apparatus and the decoding apparatus; and thus, it is designed such that the same variable length table is used for coding a coding target block and decoding a decoding target block. The coding mode number is reconstructed according to this processing.

Figure 14:
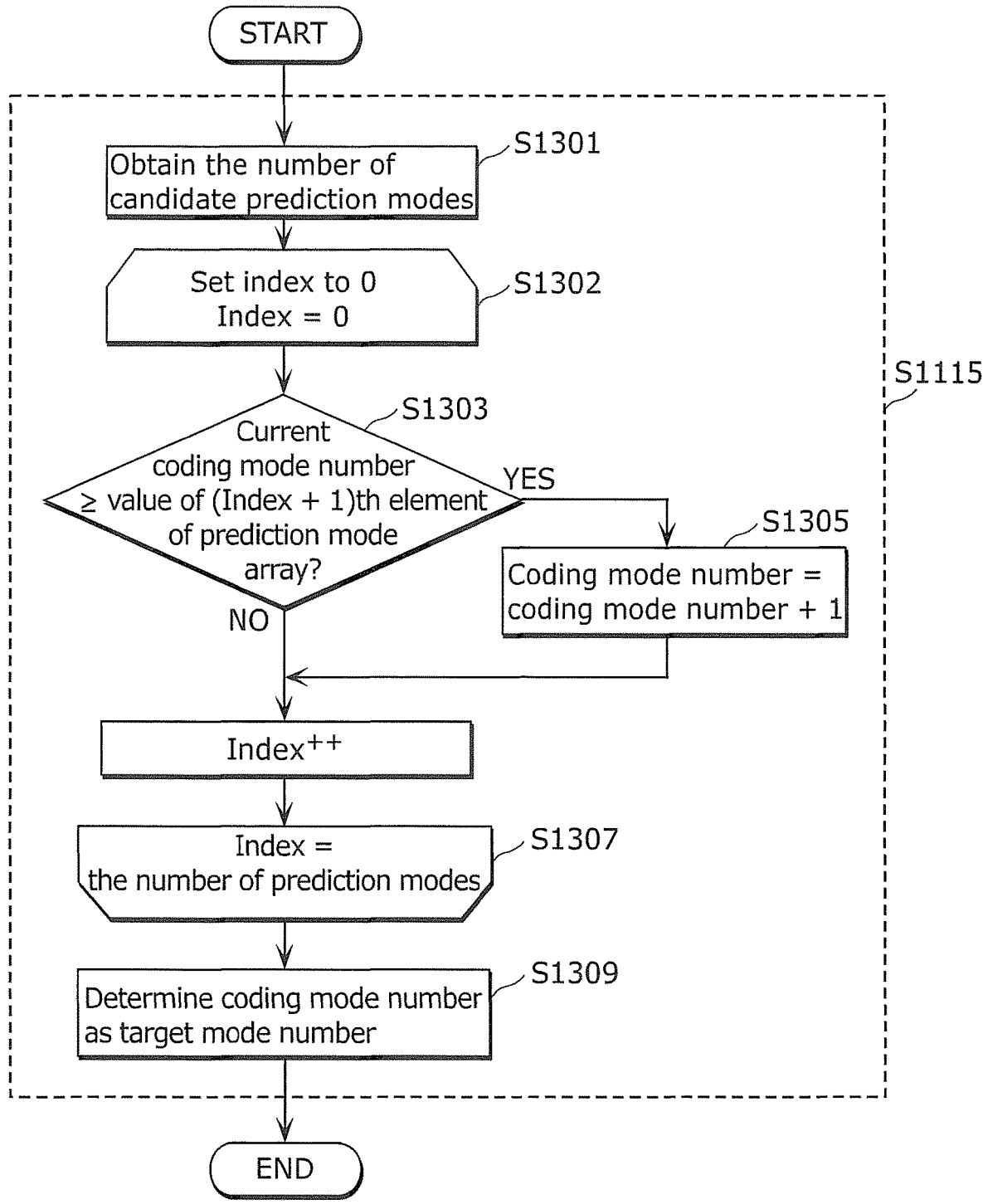
FIG. 14 is a flowchart of a detail of Step S1115.

Next, the target mode number is reconstructed from the coding mode number (Step S1115 which is the process inverse to Step S215 in FIG. 2). FIG. 14 is a flowchart of process for reconstructing the target mode number from the coding mode number.

As shown in FIG. 14, the variable length decoding unit 220 obtains the "target mode number" from the "coding mode number" obtained in Step S1117. The respective steps in FIG. 14 are executed as the steps inverse to the steps of obtaining the "coding mode number" from the "target mode number" of FIG. 3.

The variable length decoding unit 220 first obtains the number of candidate intra prediction modes (NumMPMCand) (Step S1301). In Embodiment 2, the number of candidate intra prediction modes is also two that is a fixed number as in Embodiment 1.

The variable length decoding unit 220 then repeats the loop specified as Step S1302 to Step S1307 by the number of times specified by the number of candidate intra prediction modes (NumMPMCand). In Embodiment 2, the number of candidate intra prediction modes (NumMPMCand) is two; and thus, Step S1303 (and Step S1305) is (are) executed twice in total when the values of the indices are 0 and 1. When the number of candidate prediction modes is N, Step S1303 (and Step S1305 depending on the determination in Step S1303) is executed N times.

In Step S1302, the candidate index candIdx (corresponds to Index in FIG. 14) is set to 0.

In Step S1303, the current coding mode number is compared with the value of the element specified by the value of a candidate index candIdx in the prediction mode array (CandModeList) (the value of candModeList [candIdx]). When Index=0, the coding mode number is the coding mode number at the time of obtainment in Step S1117.

In the case of YES in Step S1303 (where the coding mode number≥the value of candModeList[candIdx] is satisfied, the coding mode number is incremented by 1 (Step S1305). Here, the coding mode number is incremented by 1 also in the case where the current coding mode number is the same as the value of the prediction mode array, candModeList [candIdx]. The loop from S1302 to S1307 is repeated while incrementing the candidate index number candIdx by 1 until the comparison about all the candidate indices is completed.

Through this processing, the coding mode number is reconstructed into the target mode number according to the number of candidate intra prediction modes. Here, reconstructing the "target mode number" from the "coding mode number" according to the number of candidate intra prediction modes is equivalent to performing the process in Table 1 from the lowermost line to the uppermost line.

For example, when the number of candidate intra prediction modes (the value of NumMPMCand) is 2, the associations between coding mode numbers and target mode numbers are as shown in Table 2. This table is for explaining an exemplary case where the value of the first element (having an index 0) of the prediction mode array is assumed to be "i", and the value of the second element (having an index 1) of the prediction mode array is assumed to be "j".

[Table 2]

In this way, the decoding apparatus and decoding method

| (d)Coding mode number (0 . . . 31) | 0 | 1 | . . . | i (candModeList[0]) | . . . | j (candModeList[1]) | . . . | 30 | 31 |
|---|---|---|---|---|---|---|---|---|---|
| S1105 | 0 | 0 | 0 | +1 | +1 | +1 | +1 | +1 | +1 |
| S1105 | 0 | 0 | 0 | 0 | 0 | +1 | +1 | +1 | +1 |
| (a) Decoding mode number (0 . . . 33) | 0 | 1 | . . . | Unnecessary (candModeList[0]) | . . . | Unnecessary (candModeList[1]) | . . . | 32 | 33 | according to Embodiment 2 switch, according to the numbers of candidate intra prediction modes (or based on the number of candidate intra prediction modes), the associations between CodeNum and the "coding mode numbers" in the CAVLD scheme and the associations with the "coding mode numbers" from the binary arrays in the CABAC scheme (Step S1117). Furthermore, the associations between coding mode numbers and target mode numbers are switched according to the number of candidate intra prediction modes (S1115).

With the configuration, it is possible to reconstruct the original "target mode number" from the bit stream according to Embodiment 1 generated by switching the schemes for coding the target mode number according to the number of candidate intra prediction modes, with an increased coding efficiency.

As described earlier, in the image decoding apparatus and the image decoding method according to the present disclosure, the number of candidate intra prediction modes is fixed to two or more; and thus, it is possible to perform arithmetic decoding without requiring conditional branching for determining whether or not the number of candidate intra prediction modes is one.

Figure 12B:
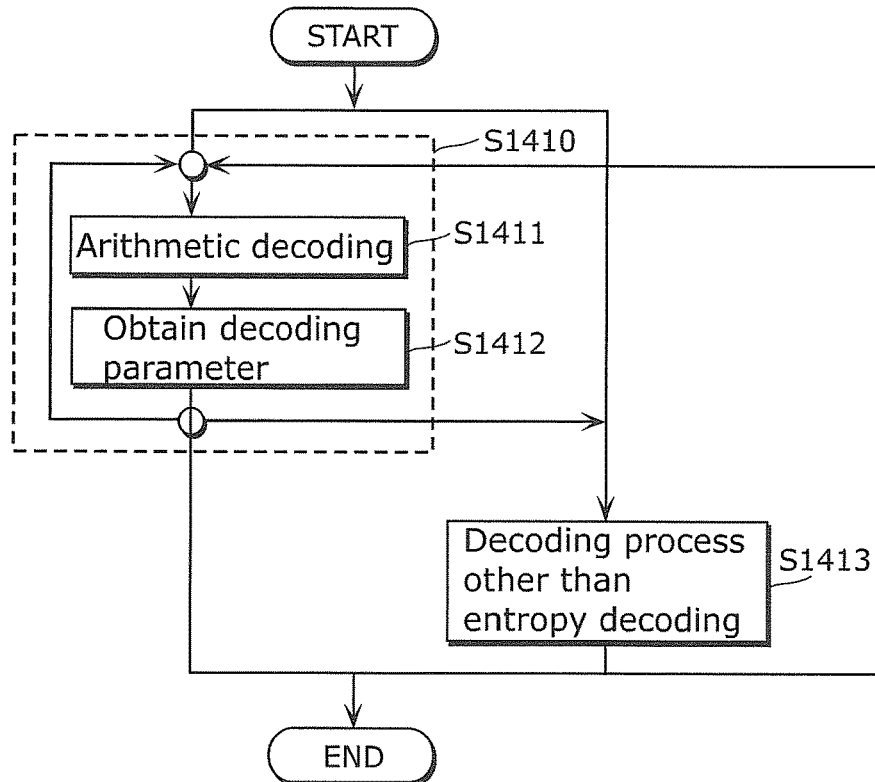
FIG. 12B is a flowchart of the arithmetic decoding processing performed when a bit string is output according to the CAVLC scheme.

FIG. 12B is a conceptual diagram for illustrating an example of the flow of the arithmetic decoding process performed in the image decoding apparatus. As described earlier, the information amount of the decoded signal (decoding parameter) for the bit length to be obtained is determined at an arithmetic rate in the arithmetic decoding; and thus, the information amount is indeterminate. In order for real-time processing, high-speed calculations are necessary. As shown in FIG. 12B, parallel arithmetic may often be performed in decoding processing. In the parallel arithmetic, the entropy decoding step S1410 where an arithmetic decoding is performed on the obtained bit stream according to a predetermined method (CABAC or CAVLC) (Step S1411) and a decoding parameter is obtained (Step S1412) is separately performed from the decoding processing step (Step S1413) where a prediction image is generated based on a decoding parameter to obtain a decoding image signal. Here, decoding information necessary for the arithmetic decoding step S1411 is obtained from the feedback of Step S1413.

The entropy decoding step S1410 needs to wait for the result of the decoding processing step S1413, which does not allow high-speed calculations. Therefore, reducing the feedback is particularly important for high-speed calculations.

As shown in FIG. 11, the image decoding apparatus according to Embodiment 2 always calls the step for decoding the candidate prediction mode number (Step S1109) when the prediction mode use flag indicates 1 (the signal decoded in the entropy decoding step) (YES in Step S1105); and thus, there is no need to wait for the completion of the decoding processing (Step S1413).

On the other hand, in the conventional syntax structure shown in FIG. 6A, it is necessary to determine the number of the prediction modes (NumMPMCand). As described earlier, the target mode numbers of adjacent above and left blocks need to be used for the determination. Thus, it is necessary to wait for the completion of the decoding processing step S1413. Therefore, the configuration according to the present disclosure increases the processing speed of the decoding apparatus.

Variation of Embodiment 1 and Embodiment 2

(1) Each of the coding control unit 100 in FIG. 1 and the control unit 210 in FIG. 10 is shown in relation with other processing units necessary for explaining only inputs and outputs of information to and from the coding control unit 110 or the coding control unit 210. However, the coding control unit 110 and the control unit 210 may input and output information necessary for other processing units via not-shown signal lines. The coding control unit or the control unit may be considered to be a controller for controlling the processing by each of the processing units.

Figure 15:
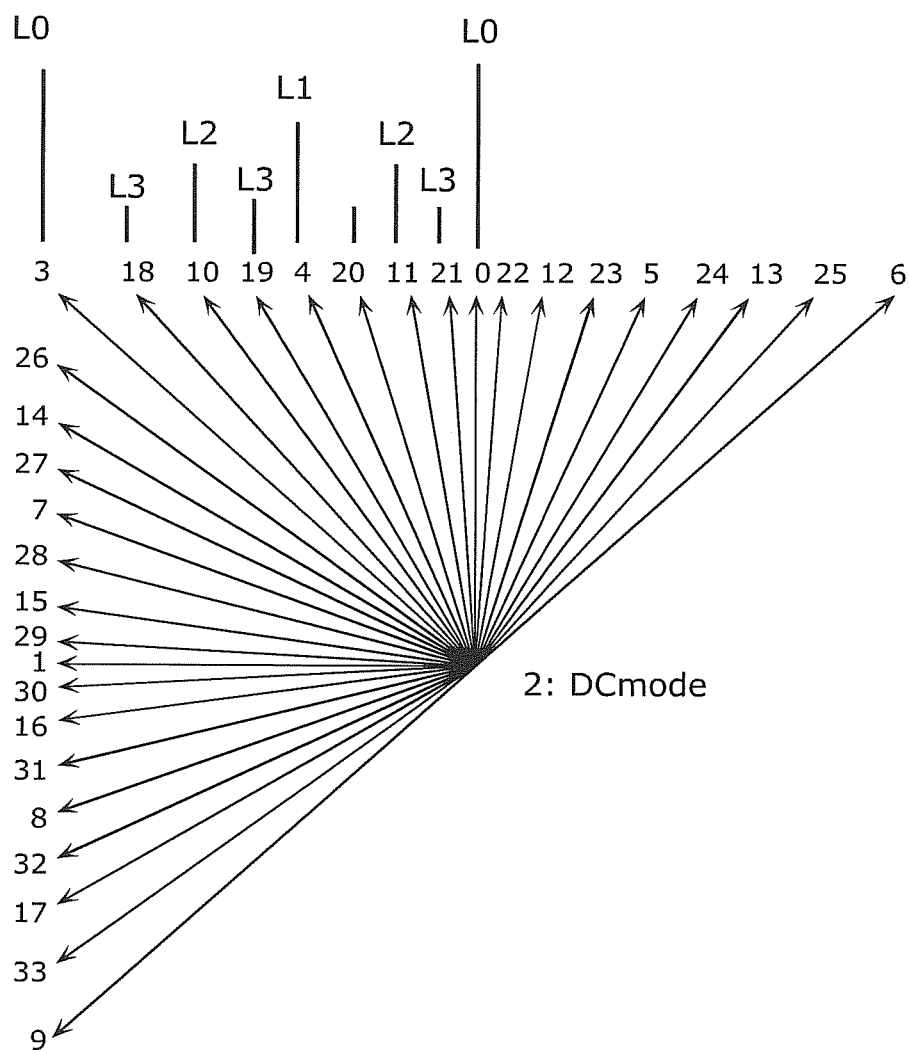
FIG. 15 is a conceptual diagram of an example of a decoding prediction mode.

(2) Coding 34 target mode numbers have been described with an example of 34 modes including 33 directions and one no-direction shown in FIG. 15. However, the same advantageous effects can be obtained even when the number of modes varies depending on the depth of the levels (L0 to L3) shown in FIG. 15.

For example, when the number of candidate intra prediction modes is (2 to the power of n)+k, the coding mode number (rem_intra_luma_pred_mode) can be expressed in n bit or n+1 bit.

With the configuration of the decoding apparatus, the syntax structure shown in FIG. 6A and FIG. 6B can be properly decoded. Furthermore, as shown in FIG. 12B, in arithmetic decoding, the case where the number of candidate intra prediction modes is one is determined by simply performing the decoding processing. Therefore, there is no need to obtain adjacent target mode numbers for comparison. As a result, high-speed and accurate decoding can be performed with smaller memory amount.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 16:
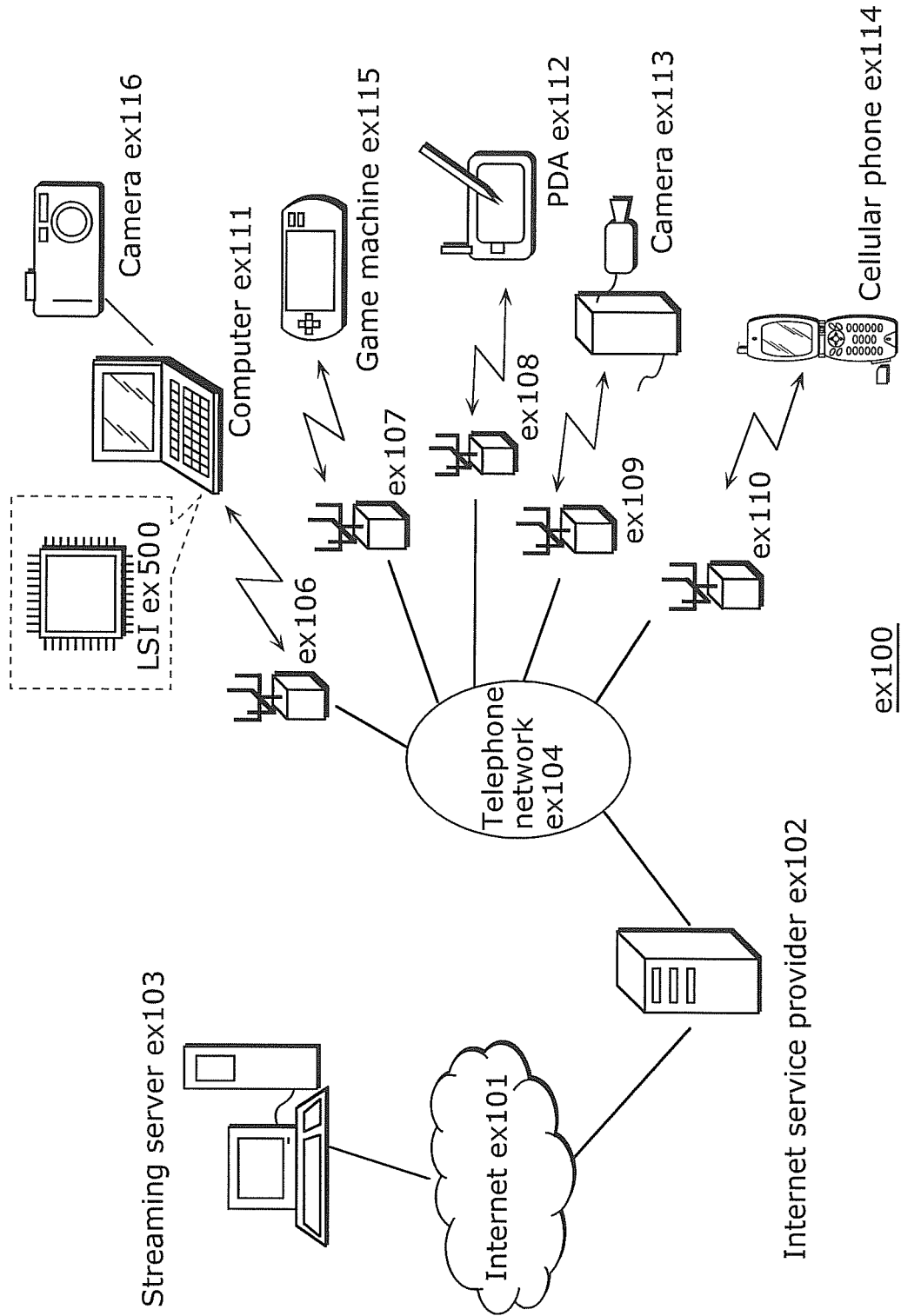
FIG. 16 shows an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
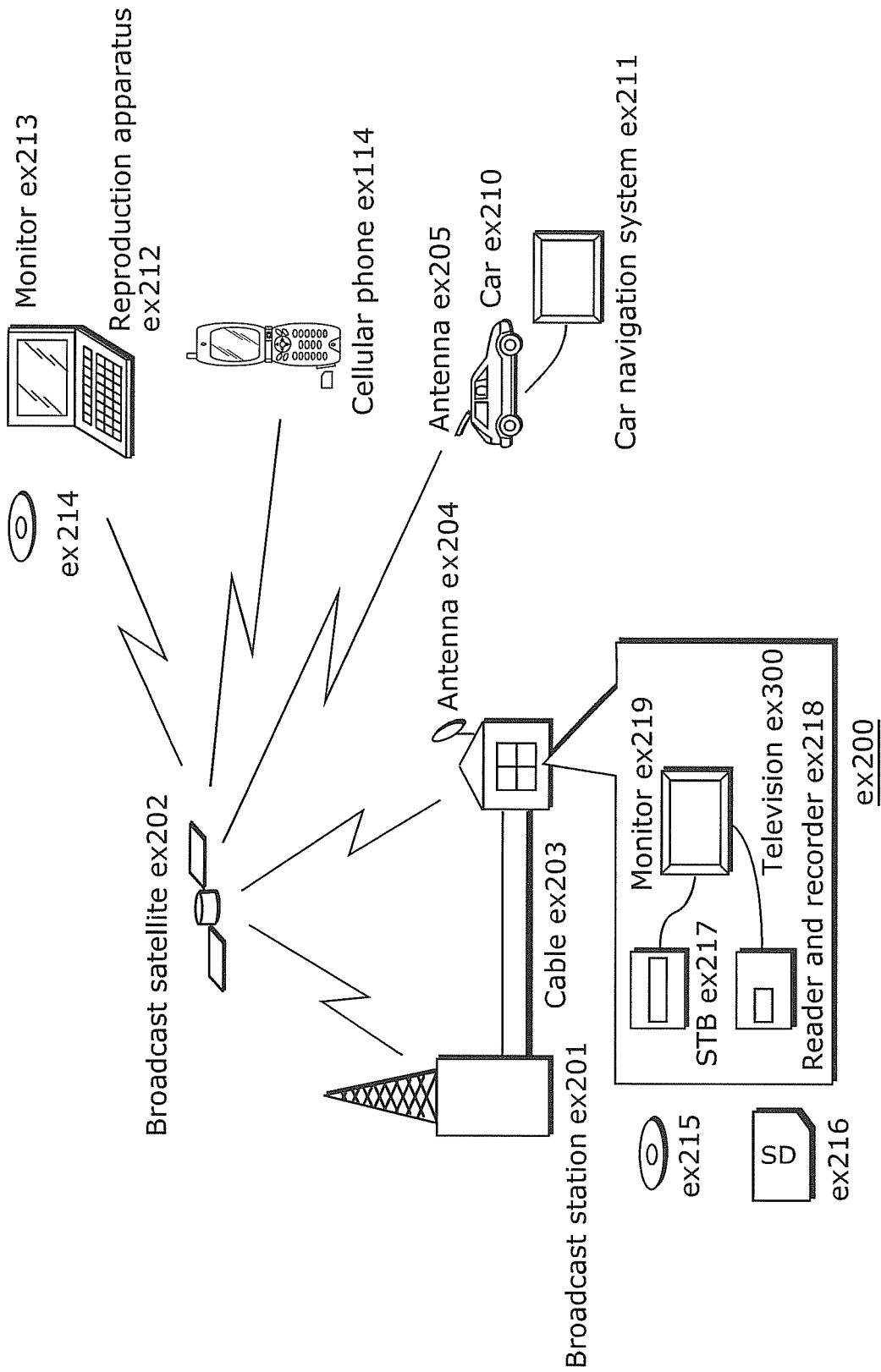
FIG. 17 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
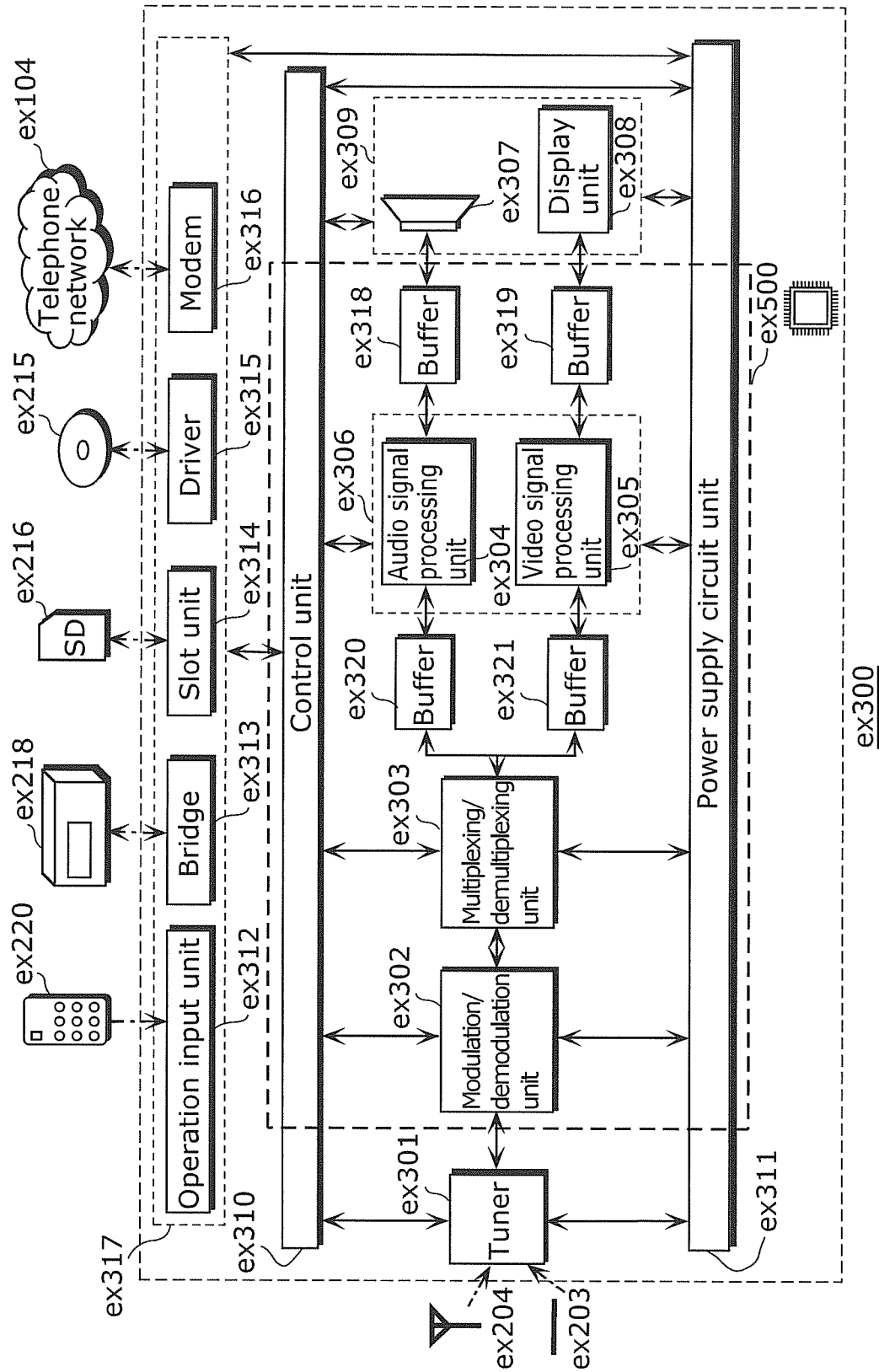
FIG. 18 is a block diagram illustrating an example of a configuration of a television.

FIG. 18 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 19:
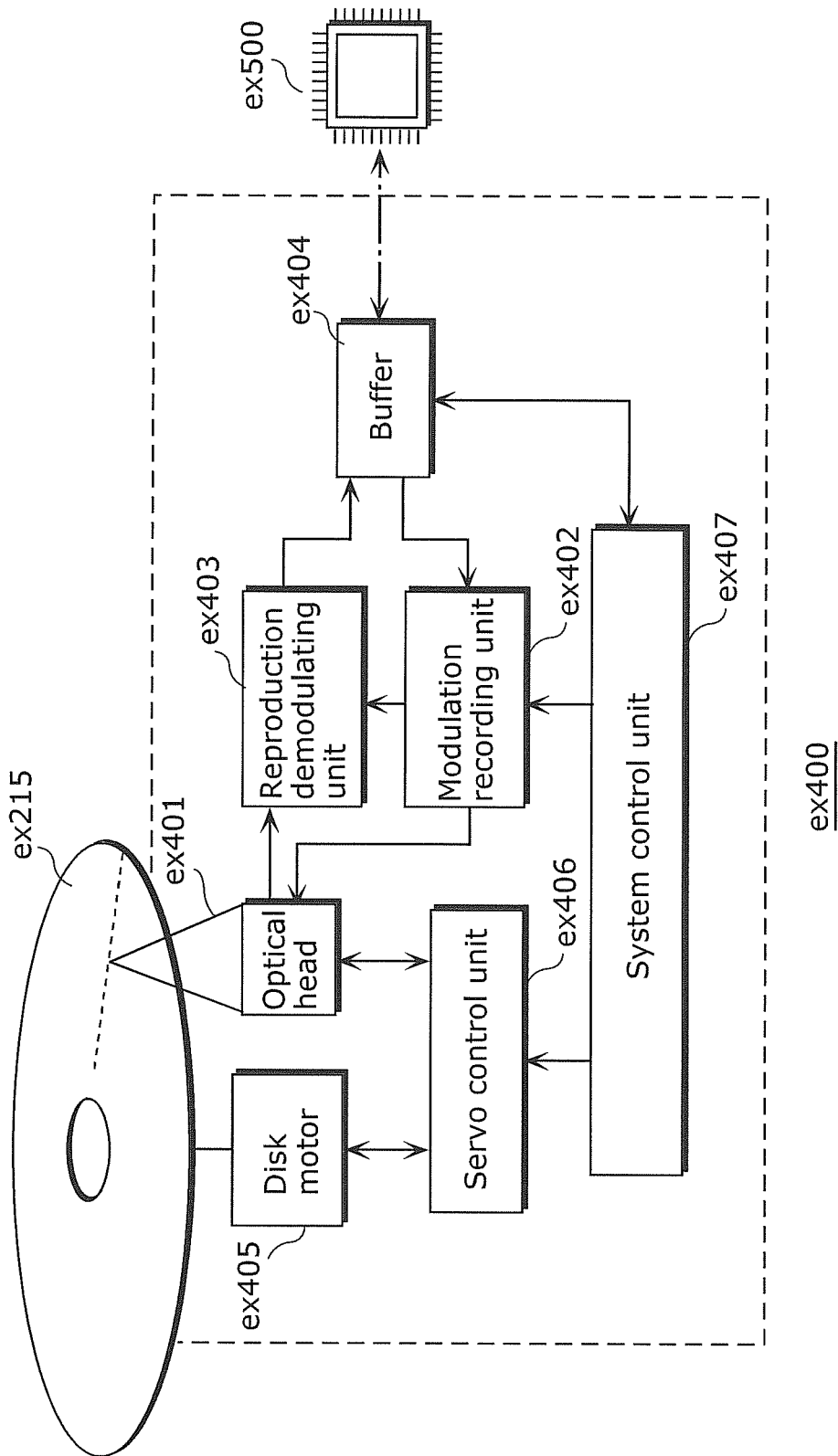
FIG. 19 is a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
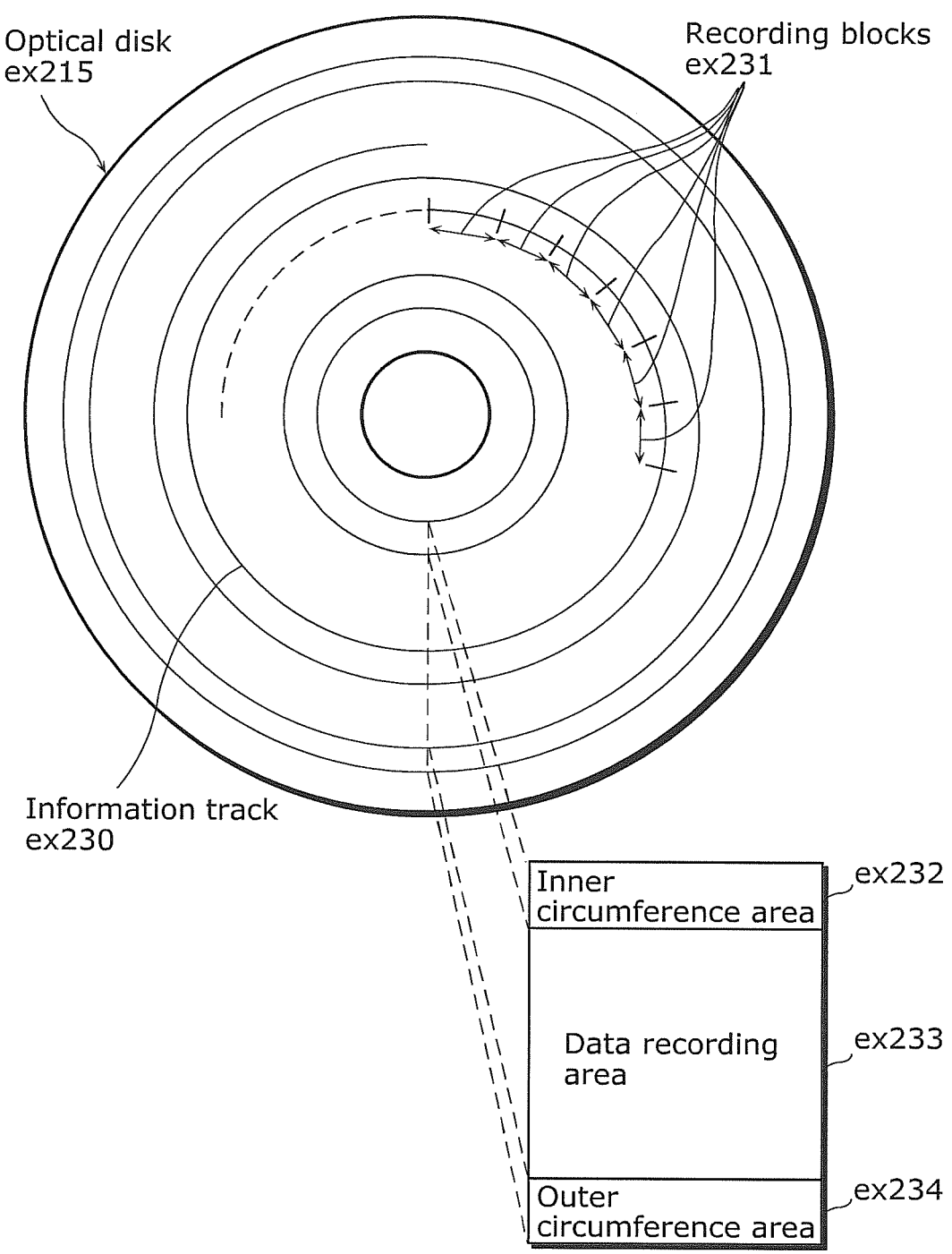
FIG. 20 shows an example of a configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
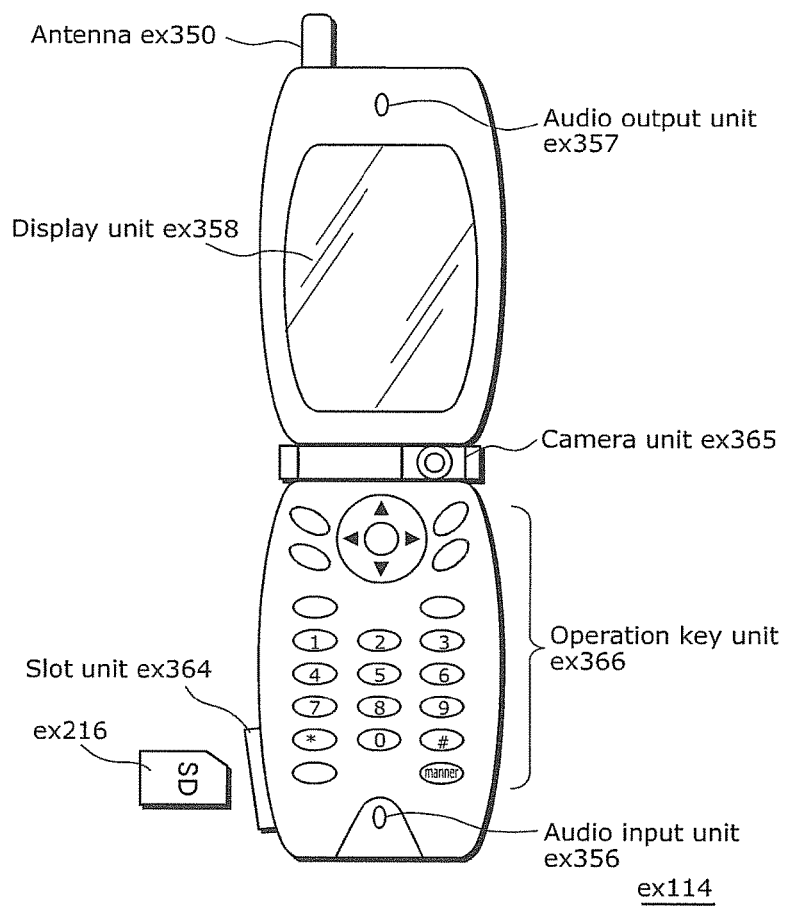
FIG. 21A shows an example of a cellular phone.

FIG. 21A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 21B:
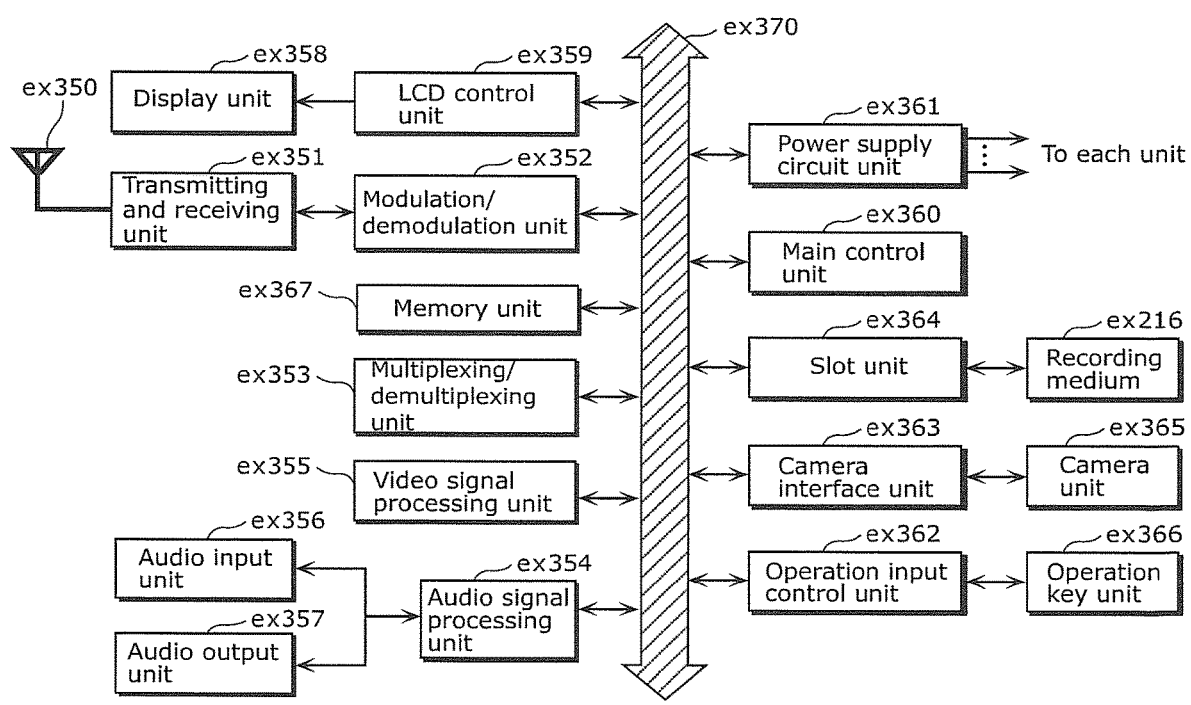
FIG. 21B is a block diagram showing an example of a configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex357 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 23:
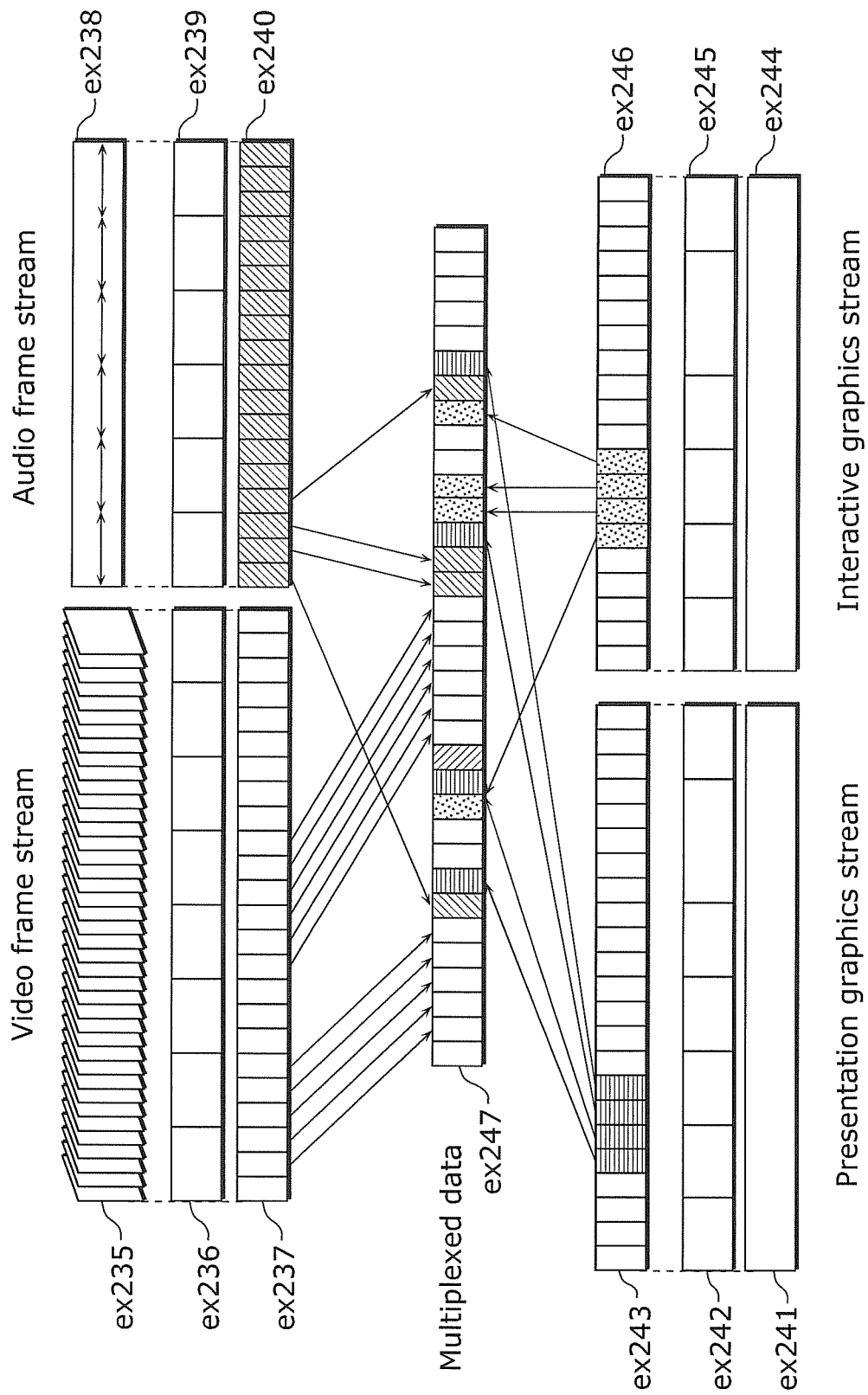
FIG. 23 schematically shows how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
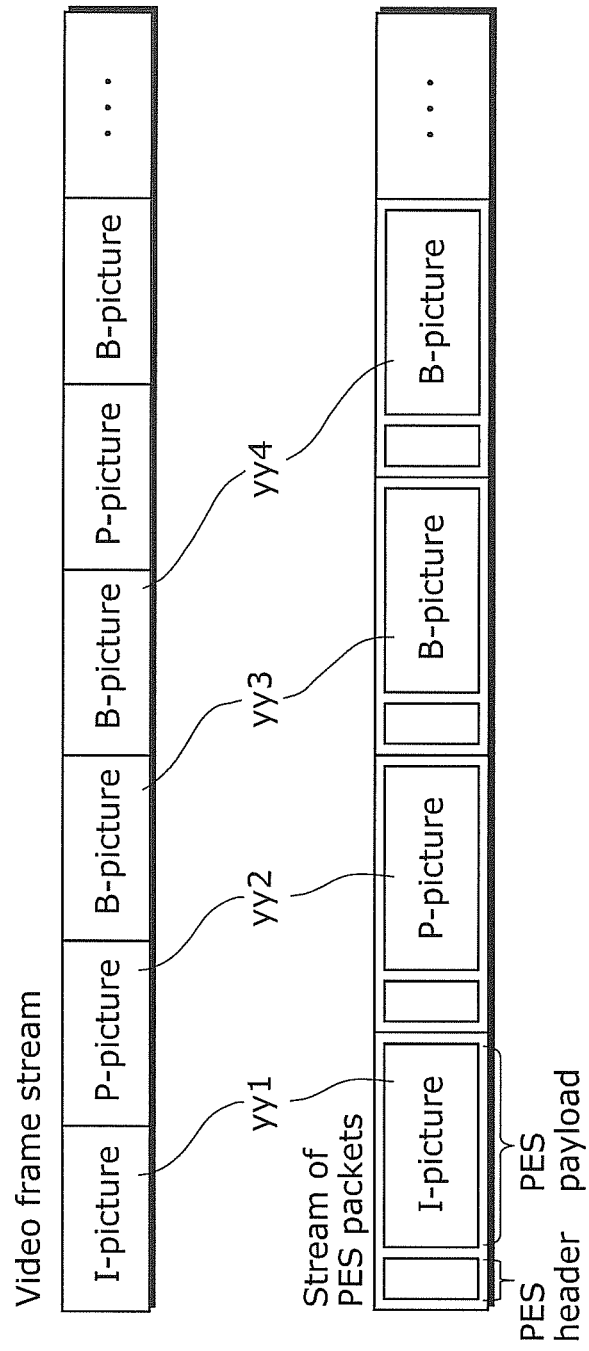
FIG. 24 shows how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
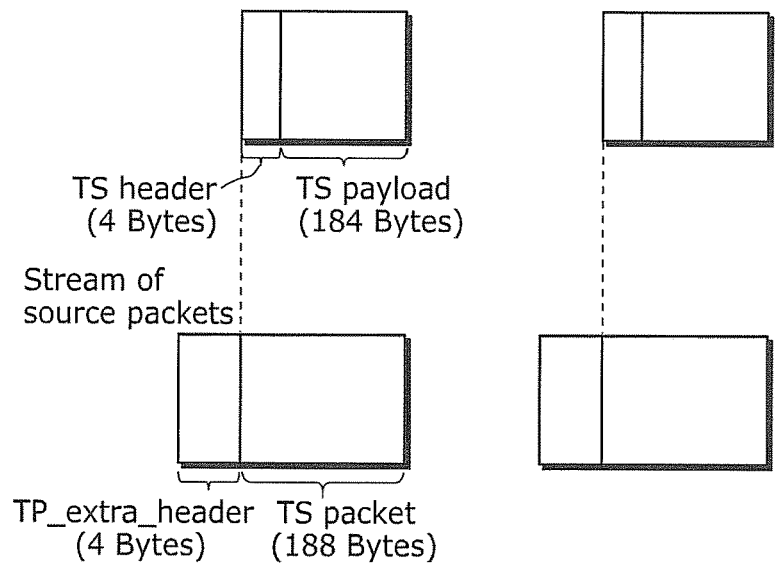
FIG. 25 shows a structure of TS packets and source packets in the multiplexed data.
Figure 25:
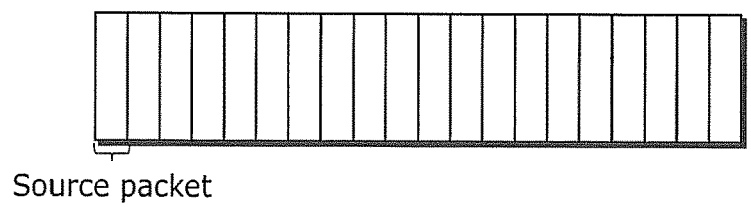

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
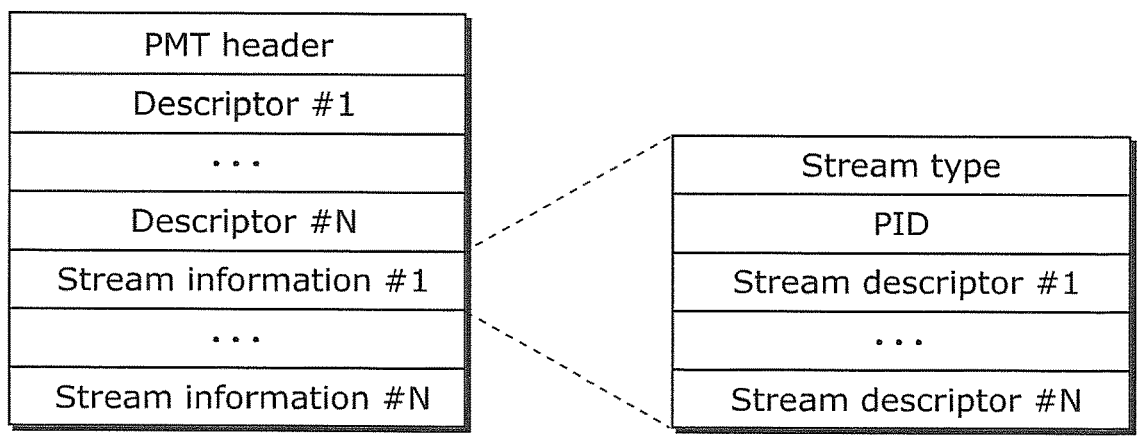
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
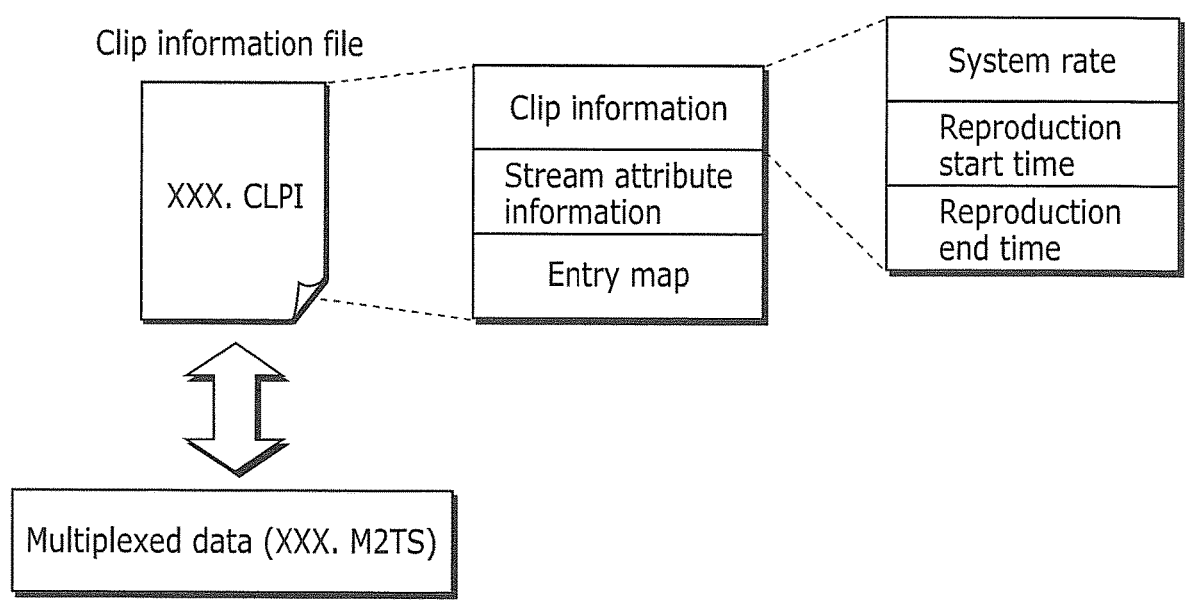
FIG. 27 illustrates an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
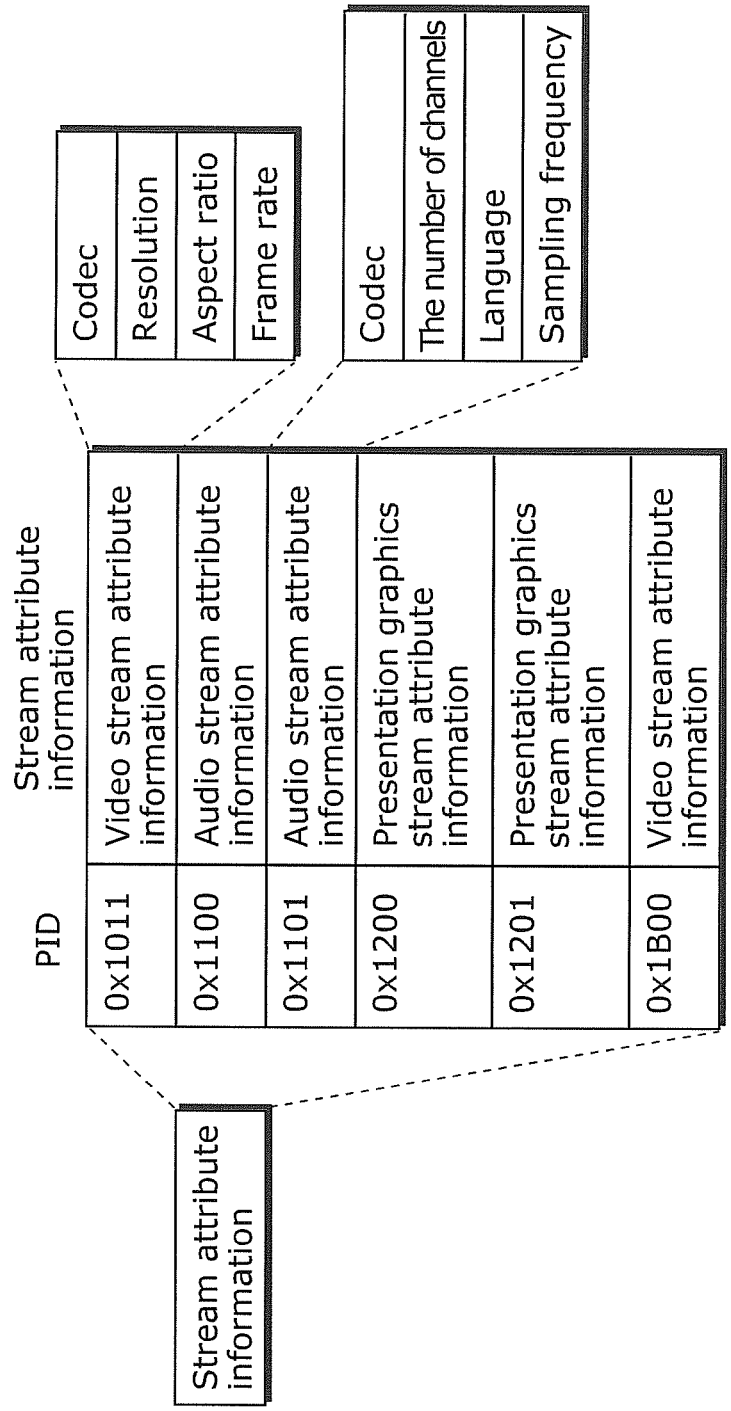
FIG. 28 illustrates an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 29:
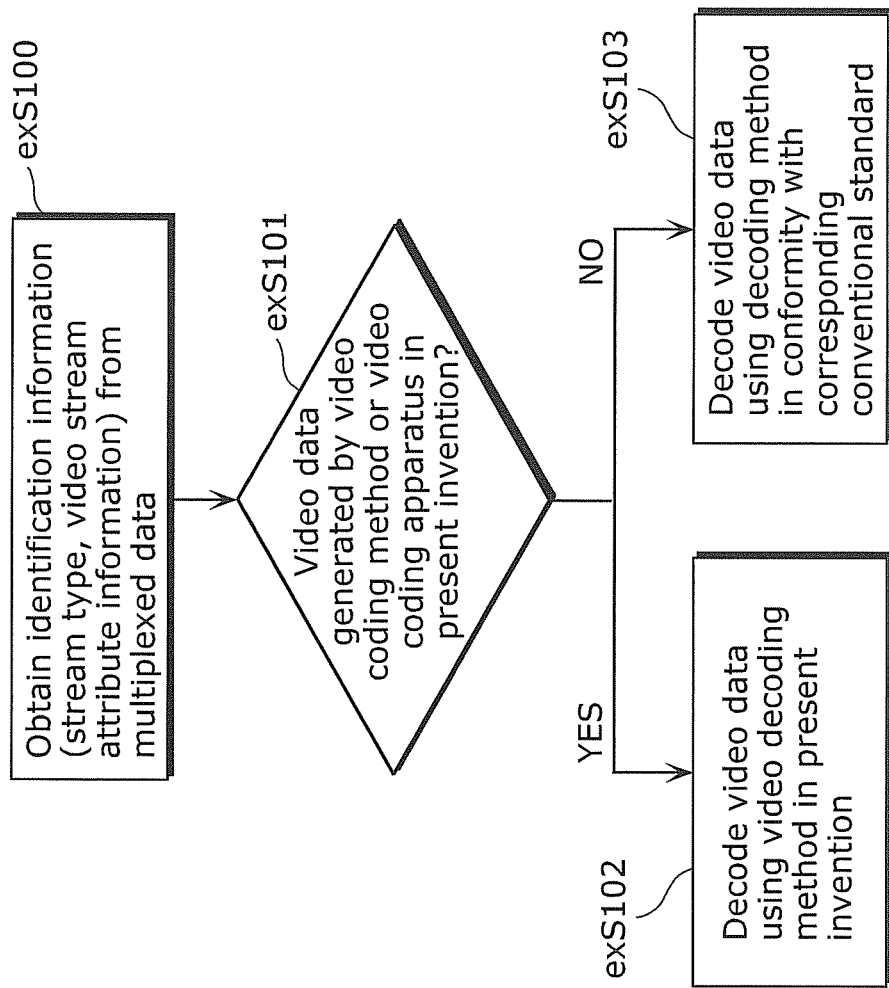
FIG. 29 shows steps for identifying video data.

Furthermore, FIG. 29 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 30:
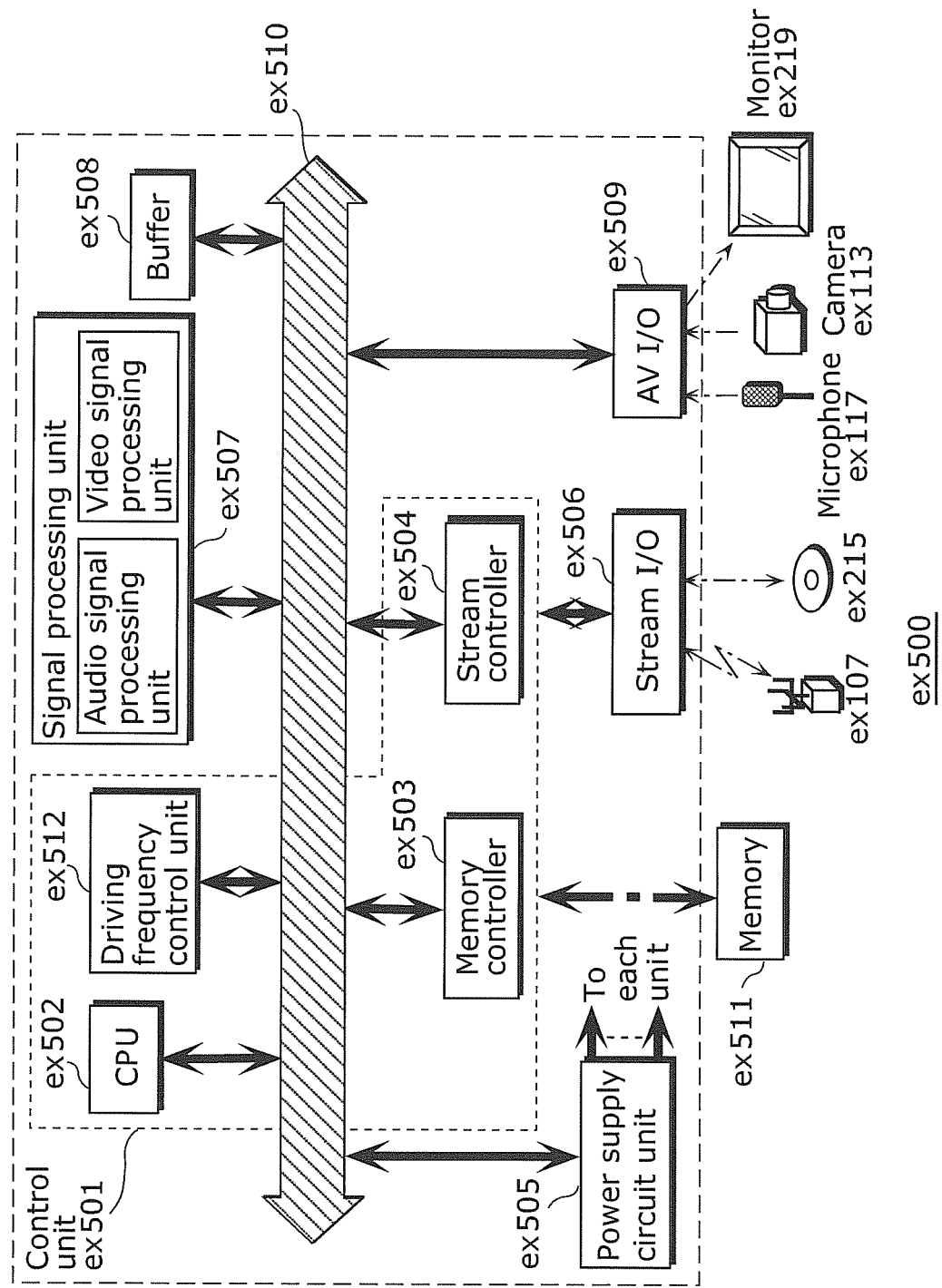
FIG. 30 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream I/O ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
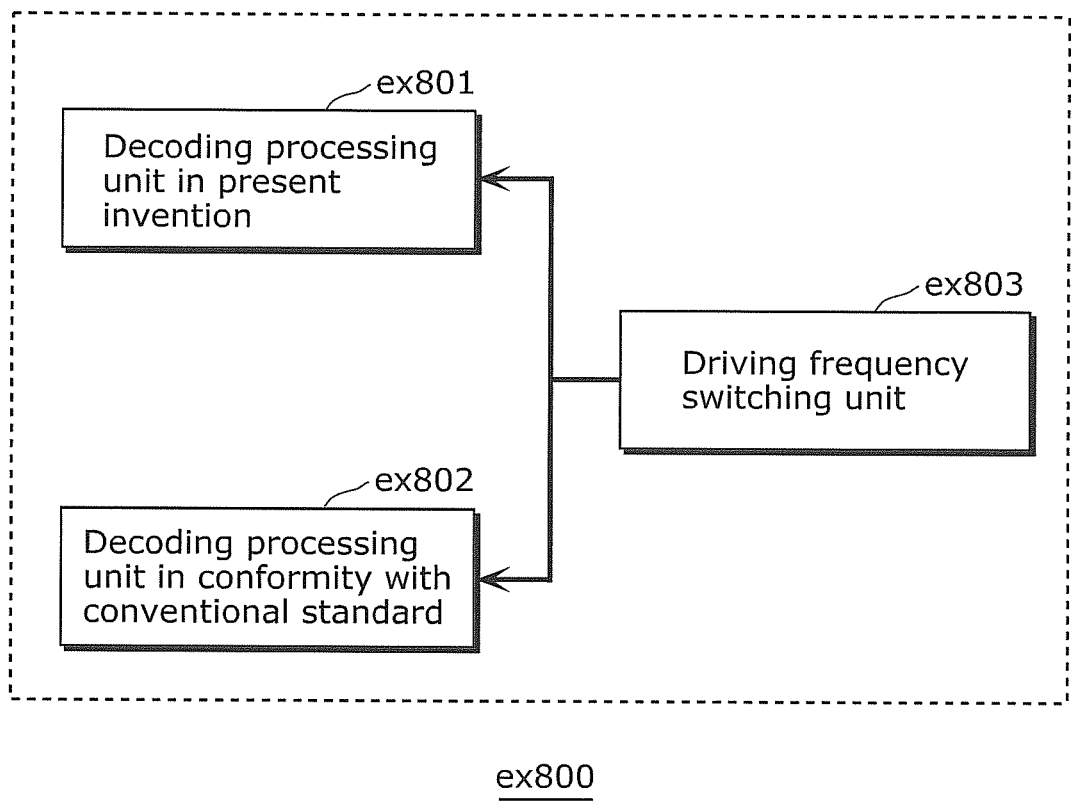
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and in an internal memory of an LSI, and with reference to the look-up table by the CPU ex502.

Figure 32:
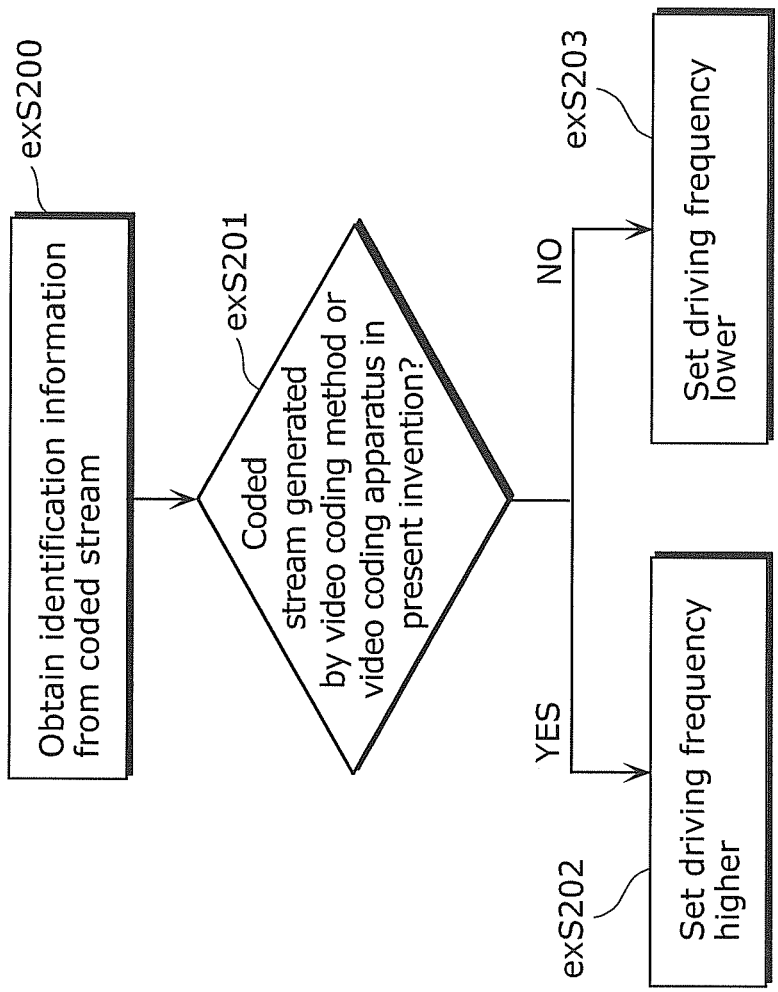
FIG. 32 shows steps for identifying video data and switching between driving frequencies.

FIG. 32 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 34A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 34B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The present disclosure relates to moving picture coding and decoding methods. More specifically, the present disclosure relates to methods of coding and decoding mode numbers for differentiating methods of generating intra prediction pixels in intra coding.

The invention claimed is:

1. An image coding method of generating a coded stream by coding image data on a block-by-block basis, the image coding method comprising:

selecting candidates for an intra prediction mode to be used for intra prediction for a coding target block from a plurality of predetermined intra prediction modes, each of the plurality of predetermined intra prediction modes having a mode number;

deriving the selected candidates, the number of the candidates constantly being a predetermined fixed plural number, the predetermined fixed plural number being at least 2 and less than a number of the plurality of predetermined intra prediction modes;

making a candidates list which includes indices and the derived candidates, the derived candidates corresponding on a one-to-one basis with the indices, and a number of the indices being equal to the predetermined fixed plural number;

generating a coded flag by coding a flag which indicating whether the intra prediction mode is inferred from a neighboring block or not;

adding the coded flag to the coded stream;

when the flag indicates that the intra prediction mode is inferred from the neighboring block,
  (i) generating a coded specified index by coding a specified index which specifies an index of one of the derived candidates as the intra prediction mode to be used for intra prediction for the coding target block,
  (ii) adding the coded specified index to the coded stream,
  (iii) determining the one of the derived candidates using the specified index, the index of the one of the derived candidates being specified by the specified index in the candidates list, and
  (iv) coding the image data using the determined one of the derived candidates; and when the flag indicates that the intra prediction mode is not inferred from the neighboring block,
  (i) generating a coded specified mode number by coding a specified mode number,
  (ii) adding the coded specified mode number to the coded stream, and
  (iii) comparing the mode number of one of the derived candidates with the specified mode number,
    when the mode number of the one of the derived candidates is larger than the specified mode number, determining the one of the derived candidates as the intra prediction mode to be used for intra prediction for the coding target block, and coding the image data using the determined one of the derived candidates, and
    when the mode number of the one of the derived candidates is smaller than or equal to the specified mode number, adding one to the specified mode number, and coding the image data using one of the plurality of predetermined intra prediction modes which is specified by the number obtained by adding one to the specified mode number, wherein the deriving includes:
  deriving a first candidate for the intra prediction mode to be used for intra prediction for the coding target block from an intra prediction mode used for intra prediction for each of adjacent blocks that are adjacent to the coding target block; and
  in a case that the number of the derived first candidates is smaller than the predetermined fixed plural number, further deriving a second candidate as a DC prediction mode to be used for intra prediction and a third candidate as a vertical (angular) prediction mode to be used for intra prediction, and wherein the comparing includes comparing each of the mode numbers of the derived candidates from a smallest index to a maximum index with the specified number, the maximum index being equal to the predetermined fixed plural number minus one,
  when the mode number of one of the derived candidates is larger than the specified mode number, determining the one of the derived candidates as the intra prediction mode to be used for intra prediction for the coding target block, and coding the image data using the determined one of the derived candidates, and
  when the mode number of one of the derived candidates is smaller than or equal to the specified mode number, (i) adding one to the specified mode number, and adding one to the index, (ii) comparing the mode number of one of the derived candidates corresponding to the number obtained by adding one to the index with the number obtained by adding one to the specified mode number, wherein the adding is repeated until the number obtained adding one to the index is equal to the maximum index or the mode number of one of the derived candidates corresponding to the number obtained by adding one to the index is larger than the number obtained by adding one to the specified mode number, and (iii) coding the image data using the one of the derived candidates which is specified by the number obtained by adding one to specified mode number or the one of the plurality of predetermined intra prediction modes which is specified by the number obtained by adding one to the index.

2. An image decoding method of decoding, on a block-by-block basis, image data included in a coded stream, the image decoding method comprising:
  selecting candidates for an intra prediction mode to be used for intra prediction for a decoding target block from a plurality of predetermined intra prediction modes, each of the plurality of predetermined intra prediction modes having a mode number;
  deriving the selected candidates, the number of the candidates constantly being a predetermined fixed plural number, the predetermined fixed plural number being at least 2 and less than a number of the plurality of predetermined intra prediction modes;
  making a candidates list which includes indices and the derived candidates, the derived candidates corresponding on a one-to-one basis with the indices, and a number of the indices being equal to the predetermined fixed plural number;
  obtaining a coded flag which indicating whether the intra prediction mode is inferred from a neighboring block or not;
  decoding the coded flag to obtain a decoded flag;
  when the decoded flag indicates that the intra prediction mode is inferred from the neighboring block,
    (i) obtaining, from the coded stream, a coded specified index which specifies an index of one of the derived candidates as the intra prediction mode to be used for intra prediction for the decoding target block,
    (ii) decoding the coded specified index to obtain a decoded specified index,
    (iii) determining the one of the derived candidates using the decoded specified index, the index of the one of the derived candidates being specified by the decoded specified index in the candidates list, and
    (iv) decoding the image data using the determined one of the derived candidates; and
  when the decoded flag indicates that the intra prediction mode is not inferred from the neighboring block,
    (i) obtaining a coded specified mode number from the coded stream,
    (ii) decoding the coded specified mode number to obtain a decoded specified mode number, and
    (iii) comparing the mode number of one of the derived candidates with the decoded specified mode number,
      when the mode number of the one of the derived candidates is larger than the decoded specified mode number, determining the one of the derived candidates as the intra prediction mode to be used for intra prediction for the decoding target block, and decoding the image data using the determined one of the derived candidates, and when the mode number of the one of the derived candidates is smaller than or equal to the decoded specified mode number, adding one to the decoded specified mode number, and decoding the image data using one of the plurality of predetermined intra prediction modes which is specified by the number obtained by adding one to the decoded specified mode number, wherein the deriving includes:

deriving a first candidate for the intra prediction mode to be used for intra prediction for the decoding target block from an intra prediction mode used for intra prediction for each of adjacent blocks that are adjacent to the decoding target block; and in a case that the number of the derived first candidates is smaller than the predetermined fixed plural number, further deriving a second candidate as a DC prediction mode to be used for intra prediction and a third candidate as a vertical (angular) prediction mode to be used for intra prediction, and wherein the comparing includes comparing each of the mode numbers of the derived candidates from a smallest index to a maximum index with the decoded specified number, the maximum index being equal to the predetermined fixed plural number minus one, when the mode number of one of the derived candidates is larger than the decoded specified mode number, determining the one of the derived candidates as the intra prediction mode to be used for intra prediction for the decoding target block, and decoding the image data using the determined one of the derived candidates, and when the mode number of one of the derived candidates is smaller than or equal to the decoded specified mode number, (i) adding one to the decoded specified mode number, and adding one to the index, (ii) comparing the mode number of one of the derived candidates corresponding to the number obtained by adding one to the index with the number obtained by adding one to the decoded specified mode number, wherein the adding is repeated until the number obtained adding one to the index is equal to the maximum index or the mode number of one of the derived candidates corresponding to the number obtained by adding one to the index is larger than the number obtained by adding one to the decoded specified mode number, and (iii) decoding the image data using the one of the derived candidates which is specified by the number obtained by adding one to specified mode number or the one of the plurality of predetermined intra prediction modes which is specified by the number obtained by adding one to the index.

* * * * *